US012787021B2

(12) United States Patent
Yoshimura et al.

(10) Patent No.: US 12,787,021 B2
(45) Date of Patent: Nov. 3, 2026

(54) TERMINAL APPARATUS, BASE STATION APPARATUS, AND COMMUNICATION METHOD

(71) Applicant: SHARP KABUSHIKI KAISHA, Sakai City (JP)

(72) Inventors: Tomoki Yoshimura, Sakai City (JP); Toshizo Nogami, Sakai City (JP); Takahisa Fukui, Sakai City (JP); Wataru Ouchi, Sakai City (JP); Shoichi Suzuki, Sakai City (JP); Daiichiro Nakashima, Sakai City (JP); Huifa Lin, Sakai City (JP); Ryota Morimoto, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 296 days.

(21) Appl. No.: 18/696,035

(22) PCT Filed: Sep. 27, 2022

(86) PCT No.: PCT/JP2022/035888
§ 371 (c)(1),
(2) Date: Mar. 27, 2024

(87) PCT Pub. No.: WO2023/054338
PCT Pub. Date: Apr. 6, 2023

(65) Prior Publication Data

US 2025/0008522 A1 Jan. 2, 2025

(30) Foreign Application Priority Data

Sep. 30, 2021 (JP) ................................ 2021-160644

(51) Int. Cl.
*H04W 72/231* (2023.01)
*H04L 5/00* (2006.01)
*H04W 72/1268* (2023.01)

(52) U.S. Cl.
CPC ..... *H04W 72/231* (2023.01); *H04W 72/1268* (2013.01); *H04L 5/0007* (2013.01)

(58) Field of Classification Search
CPC ........... H04W 72/231; H04W 72/1268; H04W 72/0446; H04L 5/0007; H04L 5/0053; H04L 5/0094; H04L 5/0044
See application file for complete search history.

(56) References Cited

U.S. PATENT DOCUMENTS 12,464,516 B2 * 11/2025 Panteleev ............. H04L 5/0053
2018/0317207 A1 * 11/2018 Liao .................. H04W 72/0446
(Continued)

OTHER PUBLICATIONS

RAN chair, "Summary of RAN Rel-18 Workshop", RWS-210659, 3GPP RAN Rel-18 workshop, Jun. 28-Jul. 2, 2021.

*Primary Examiner* — Oussama Roudani
(74) *Attorney, Agent, or Firm* — ScienBiziP, P.C.

(57) ABSTRACT

A first aspect of the present invention is a terminal apparatus including an RRC layer processing circuitry that manages an RRC parameter used to determine which of first slot counting and second slot counting is used to determine a transmission occasion for a PUSCH, and a physical layer processing circuitry that refers to the number of repetitions K of the PUSCH in addition to a value of the RRC parameter to determine which of the first slot counting and the second slot counting is used to determine the transmission occasion for the PUSCH, in which in a case that the number of repetitions K is greater than 1, one of the first slot counting or the second slot counting is used to determine the transmission occasion for the PUSCH, based on the RRC parameter, and in a case that the number of repetitions K is 1, the first slot
(Continued)

counting is used to determine the transmission occasion for the PUSCH regardless of the value of the RRC parameter.

5 Claims, 8 Drawing Sheets

(56) References Cited

U.S. PATENT DOCUMENTS

| | | | | |
|---|---|---|---|---|
| 2020/0045700 | A1* | 2/2020 | Sun | H04L 5/0091 |
| 2022/0264545 | A1* | 8/2022 | Wei | H04L 5/0091 |
| 2025/0038893 | A1* | 1/2025 | Kim | H04L 1/1854 |

* cited by examiner

| Value of TDRA field | K2 | SLIV | K |
|---|---|---|---|
| 0 | 3 | S=0, L=14 | 4 |
| 1 | 2 | S=3, L=11 | 8 |
| 2 | 2 | S=6, L=8 | 4 |
| 3 | 1 | S=8, L=2 | 1 |

FIG. 7

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2021-160644 filed on Sep. 30, 2021, the contents of which are incorporated herein by reference.

BACKGROUND ART

In the 3rd Generation Partnership Project (3GPP), a radio access method and a radio network for cellular mobile communications (hereinafter also referred to as "Long Term Evolution (LTE)" or "Evolved Universal Terrestrial Radio Access (EUTRA)") have been studied. In LTE, a base station apparatus is also referred to as an evolved NodeB (eNodeB) and a terminal apparatus is also referred to as a User Equipment (UE). LTE is a cellular communication system in which multiple areas covered by base station apparatuses are arranged in a form of cells. A single base station apparatus may manage multiple serving cells.

In the 3GPP, a radio communication standard (New Radio, NR) formulation operation has been performed. The 3GPP has further been studying for extension of the radio communication standard (NPL 1).

CITATION LIST

Non Patent Literature

NPL 1: "Summary of RAN Rel-18 Workshop", RWS-210659, RAN chair, 3GPP RAN Rel-18 workshop, 28 Jun.-2 Jul., 2021

SUMMARY OF INVENTION

Technical Problem

An aspect of the present invention provides a terminal apparatus and a base station apparatus that efficiently perform communication, and a communication method used for the terminal apparatus.

Solution to Problem (1) A first aspect of the present invention is a terminal apparatus including an RRC layer processing circuitry that manages a Radio Resource Control (RRC) parameter used to determine which of first slot counting and second slot counting is used to determine a transmission occasion for a Physical Uplink Shared CHannel (PUSCH), and a physical layer processing circuitry that refers to the number of repetitions K of the PUSCH in addition to a value of the RRC parameter to determine which of the first slot counting and the second slot counting is used to determine the transmission occasion for the PUSCH, in which in a case that the number of repetitions K is greater than 1, one of the first slot counting or the second slot counting is used to determine the transmission occasion for the PUSCH, based on the RRC parameter, and in a case that the number of repetitions K is 1, the first slot counting is used to determine the transmission occasion for the PUSCH regardless of the value of the RRC parameter.

(2) A second aspect of the present invention is base station apparatus including an RRC layer processing circuitry that manages a Radio Resource Control (RRC) parameter used to determine which of first slot counting and second slot counting is used to determine a transmission occasion for a Physical Uplink Shared CHannel (PUSCH), in which the number of repetitions K of the PUSCH is referred to in addition to a value of the RRC parameter to determine which of the first slot counting and the second slot counting is used to determine the transmission occasion for the PUSCH, in a case that the number of repetitions K is greater than 1, one of the first slot counting or the second slot counting is used to determine the transmission occasion for the PUSCH, based on the RRC parameter, and in a case that the number of repetitions K is 1, the first slot counting is used to determine the transmission occasion for the PUSCH regardless of the value of the RRC parameter.

(3) A third aspect of the present invention is a communication method used for a terminal apparatus, the communication method including the steps of managing a Radio Resource Control (RRC) parameter used to determine which of first slot counting and second slot counting is used to determine a transmission occasion for a Physical Uplink Shared CHannel (PUSCH), and referring to the number of repetitions K of the PUSCH in addition to a value of the RRC parameter to determine which of the first slot counting and the second slot counting is used to determine the transmission occasion for the PUSCH, in which in a case that the number of repetitions K is greater than 1, one of the first slot counting or the second slot counting is used to determine the transmission occasion for the PUSCH, based on the RRC parameter, and in a case that the number of repetitions K is 1, the first slot counting is used to determine the transmission occasion for the PUSCH regardless of the value of the RRC parameter.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 7 is a diagram illustrating a configuration example of a TDRA table according to an aspect of the present embodiment.

DESCRIPTION OF EMBODIMENTS floor(C) may be a floor function for a real number C. For example, floor(C) may be a function that outputs a maximum integer in a range of not exceeding the real number C. ceil(D) may be a ceiling function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I. max(J, K) is a function that outputs a maximum value out of J and K. Here, in a case that J and K are equal, max(J, K) is a function that outputs J or K. min(L, M) is a function that outputs a maximum value out of L and M. Here, in a case that L and M are equal, min(L, M) is a function that outputs L or M. round(N) is a function that outputs an integer value of a value closest to N. "·" represents multiplication.

Figure 1:
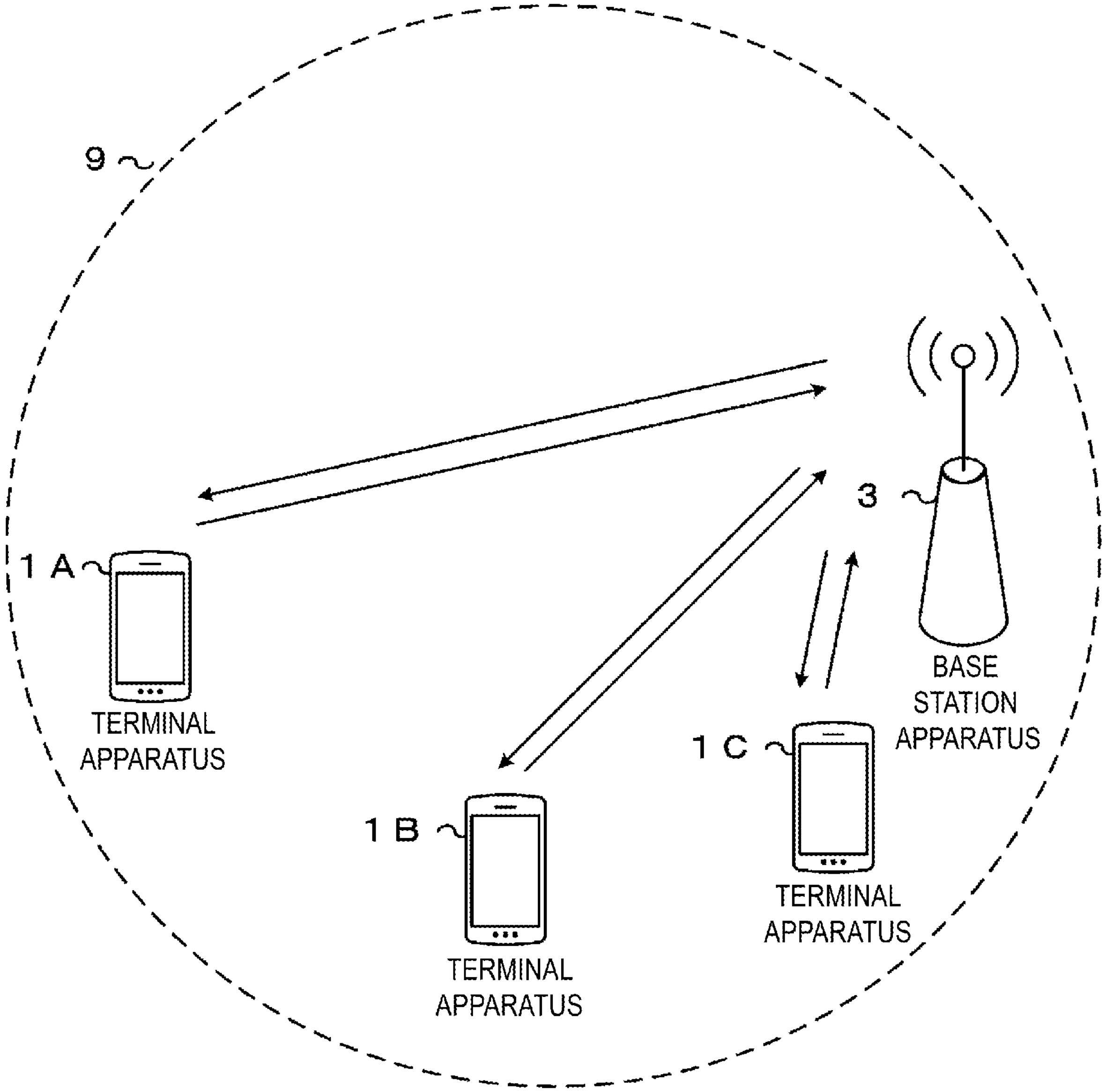
FIG. 1 is a conceptual diagram of a radio communication system according to an aspect of the present embodiment.

FIG. 1 is a conceptual diagram of a radio communication system 9 according to an aspect of the present embodiment. In FIG. 1, the radio communication system includes terminal apparatuses 1A to 1C and a base station apparatus 3 (Base station #3 (BS #3)). Hereinafter, as a general term for the terminal apparatuses 1A to 1C, the terminal apparatuses communicating with the base station apparatus 3 are also referred to as a terminal apparatus 1 (User Equipment #1 (UE #1)).

In the radio communication system 9, the terminal apparatus 1 and the base station apparatus 3 may use one or multiple communication schemes. For example, in a downlink of the radio communication system 9, Cyclic Prefix-Orthogonal Frequency Division Multiplex (CP-OFDM) may be used. In an uplink of the radio communication system 9, either CP-OFDM or Discrete Fourier Transform-spread-Orthogonal Frequency Division Multiplex (DFT-s-OFDM) may be used. Here, DFT-s-OFDM is a communication scheme in which Transform precoding is applied to CP-OFDM before signal generation. Here, Transform precoding is also referred to as DFT precoding.

As illustrated in FIG. 1, the base station apparatus 3 may include one transmission and/or reception apparatus (or transmission point, transmission apparatus, reception point, reception apparatus, transmission and/or reception point). On the other hand, in some cases, the base station apparatus 3 may include multiple transmission and/or reception apparatuses. In a case that the base station apparatus 3 includes multiple transmission and/or reception apparatuses, the multiple transmission and/or reception apparatuses may be arranged at geographically different positions.

The base station apparatus 3 may provide one or multiple serving cells. The serving cell may be defined as a set of resources used in the radio communication system 9. Here, the serving cell is also referred to as a cell.

The serving cell may include either or both of one downlink component carrier and one uplink component carrier. The serving cell may include either or both of two or more downlink component carriers, and/or two or more uplink component carriers. The downlink component carrier and the uplink component carrier are also generally referred to as a component carrier.

For a component carrier, one or multiple SCS-specific carrier may be configured. One subcarrier-spacing configuration may be associated with one SCS-specific carrier.

The resources in the radio communication system 9 may be managed by a resource grid using subcarrier indices and OFDM symbol indices.

The SubCarrier Spacing (SCS) $\Delta f$ for a certain subcarrier spacing configuration $\mu$ may be $\Delta f=2^{\mu}*15$ kHz. For example, the subcarrier spacing configuration $\mu$ may indicate one of 0, 1, 2, 3, or 4.

The time unit $T_c=1/(\Delta f_{max}*N_f)$ may be used to represent the length of the time domain. Here $\Delta f_{max}$ may be 480 kHz. $N_f$ may be 4096. A constant $\kappa$ may be $\kappa=\Delta f_{max}*N_f/(\Delta f_{ref}*N_{f,ref})=64$. $\Delta f_{ref}$ may be 15 kHz. $N_{f,ref}$ is 2048.

Transmission of a signal in the downlink/uplink may be organized into a radio frame (system frame, frame) having the length $T_f$. Here, $T_f$ may be $(\Delta f_{max}*N_f/100)*T_s=10$ ms.

The radio frame may include 10 subframes. Here, the length $T_{sf}$ of the subframe may be $(\Delta f_{max}N_f/1000)*T_s=1$ ms. The number of OFDM symbols per subframe may be $N^{subframe,\mu}_{symb}=N^{slot}_{symb}*N^{subframe,\mu}_{slot}$.

An OFDM symbol is used as a time domain unit of the communication scheme used in the radio communication system 9. For example, the OFDM symbol may be used as a time domain unit of CP-OFDM. The OFDM symbol may be used as a time domain unit of DFT-s-OFDM.

The slot may include multiple OFDM symbols. For example, $N^{slot}_{symb}$ continuous OFDM symbols may constitute one slot. For example, in normal CP configuration, $N^{slot}_{symb}$ may be 14. In extended CP configuration, $N^{slot}_{symb}$ may be 12.

The slots may be indexed in the time domain. For example, slot indices $n^{\mu}_{s}$ may be given in ascending order in the subframe with integer values within a range of 0 to $N^{subframe,\mu}_{slot}-1$. Slot indices $n^{\mu}_{s,f}$ may be given in ascending order in the radio frame with integer values within a range of 0 to $N^{frame,\mu}_{slot}-1$.

Figure 2:
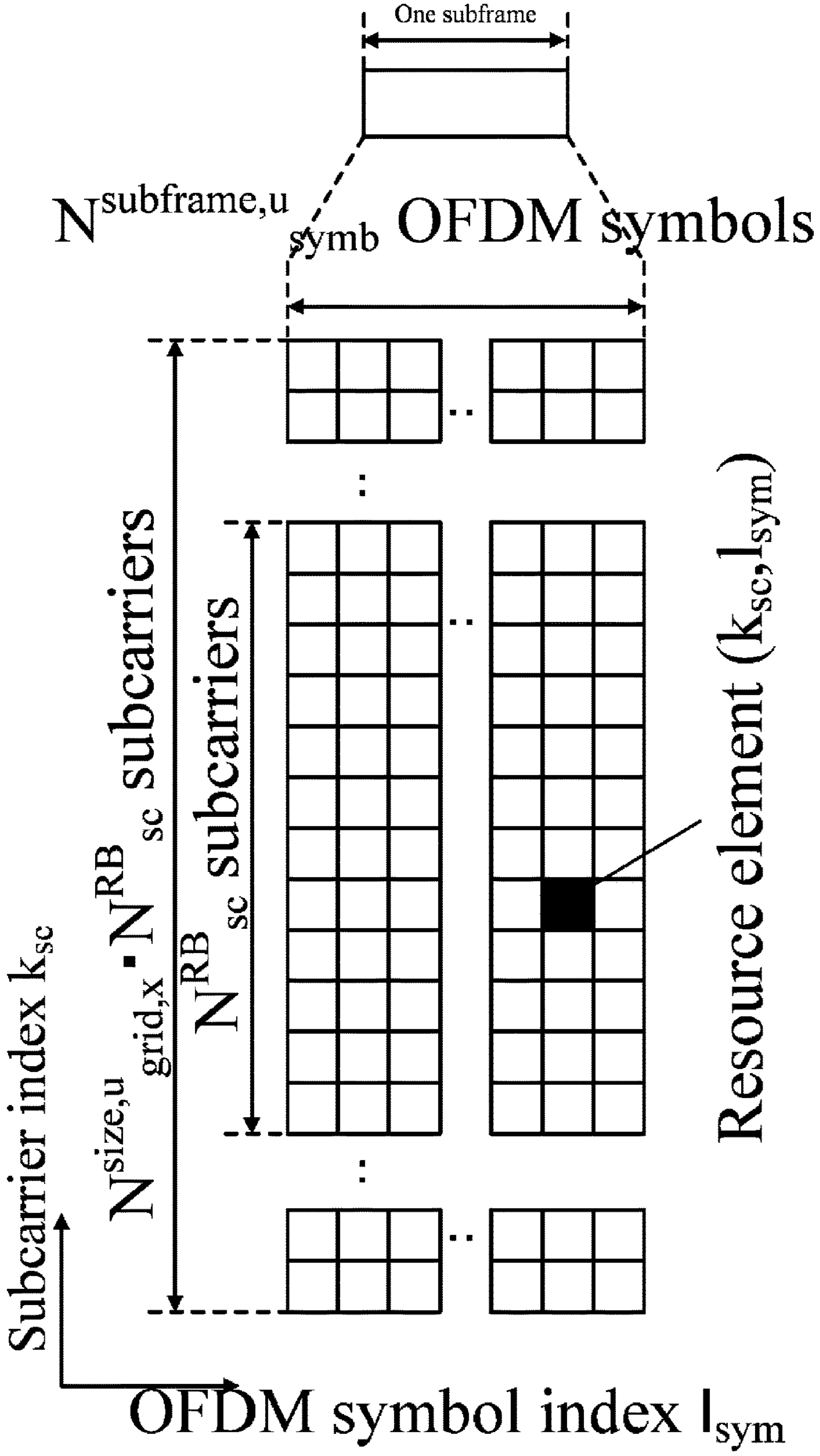
FIG. 2 is a diagram illustrating a configuration example of a resource grid according to an aspect of the present embodiment.

FIG. 2 is a diagram illustrating a configuration example of the resource grid according to an aspect of the present embodiment. In the resource grid of FIG. 2, the horizontal axis corresponds to an OFDM symbol index $l_{sym}$, and the vertical axis corresponds to a subcarrier index $k_{sc}$. The resource grid in FIG. 2 includes $N^{size,\mu}_{grid,x}*N^{RB}_{sc}$ subcarriers, and $N^{subframe,\mu}_{symb}$ OFDM symbols. Here, $N^{size,\mu}_{grid,x}$ denotes the bandwidth of the SCS-specific carrier. The unit of the value of $N^{size,\mu}_{grid,x}$ is a resource block.

In the resource grid, a resource identified by the subcarrier index $k_{sc}$ and the OFDM symbol index $l_{sym}$ is also referred to as a Resource Element (RE).

The Resource Block (RB) includes $N^{RB}_{sc}$ consecutive subcarriers. The resource block is a general term for a common resource block, a Physical Resource Block (PRB), and a Virtual Resource Block (VRB). For example, $N^{RB}_{sc}$ may be 12.

A BandWidth Part (BWP) may be configured as a subset of the resource grid. The BWP configured for the downlink is also referred to as a downlink BWP. The BWP configured for the uplink is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. The symbol may correspond to a modulation symbol mapped to a resource element. Here, the "channel" may mean a "propagation path". The "channel" may mean a "physical channel".

In a case that a large scale property of a channel over which a symbol on one antenna port is conveyed can be inferred from a channel over which a symbol on another antenna port is conveyed, two antenna ports are considered to be in a Quasi Co-Located (QCL) relationship. Here, the large scale property may include long term performance of a channel. The large scale property may include a part or all of delay spread, Doppler spread, Doppler shift, an average gain, an average delay, and a beam parameter (spatial Rx parameters). The fact that the first antenna port and the second antenna port are QCL with respect to a beam parameter may mean that a reception beam assumed by a receiver side for the first antenna port and a reception beam assumed by the receiver side for the second antenna port are the same (or the reception beams correspond to each other). The fact that the first antenna port and the second antenna port are QCL with respect to a beam parameter may mean that a transmission beam assumed by a receiver side for the first antenna port and a transmission beam assumed by the receiver side for the second antenna port are the same (or the transmission beams correspond to each other). In a case that the large scale property of a channel over which a symbol on one antenna port is conveyed can be inferred from a channel over which a symbol on another antenna port is conveyed, the terminal apparatus 1 may assume that the two antenna ports are QCL. The fact that two antenna ports are QCL may mean that the two antenna ports are assumed to be QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 3:
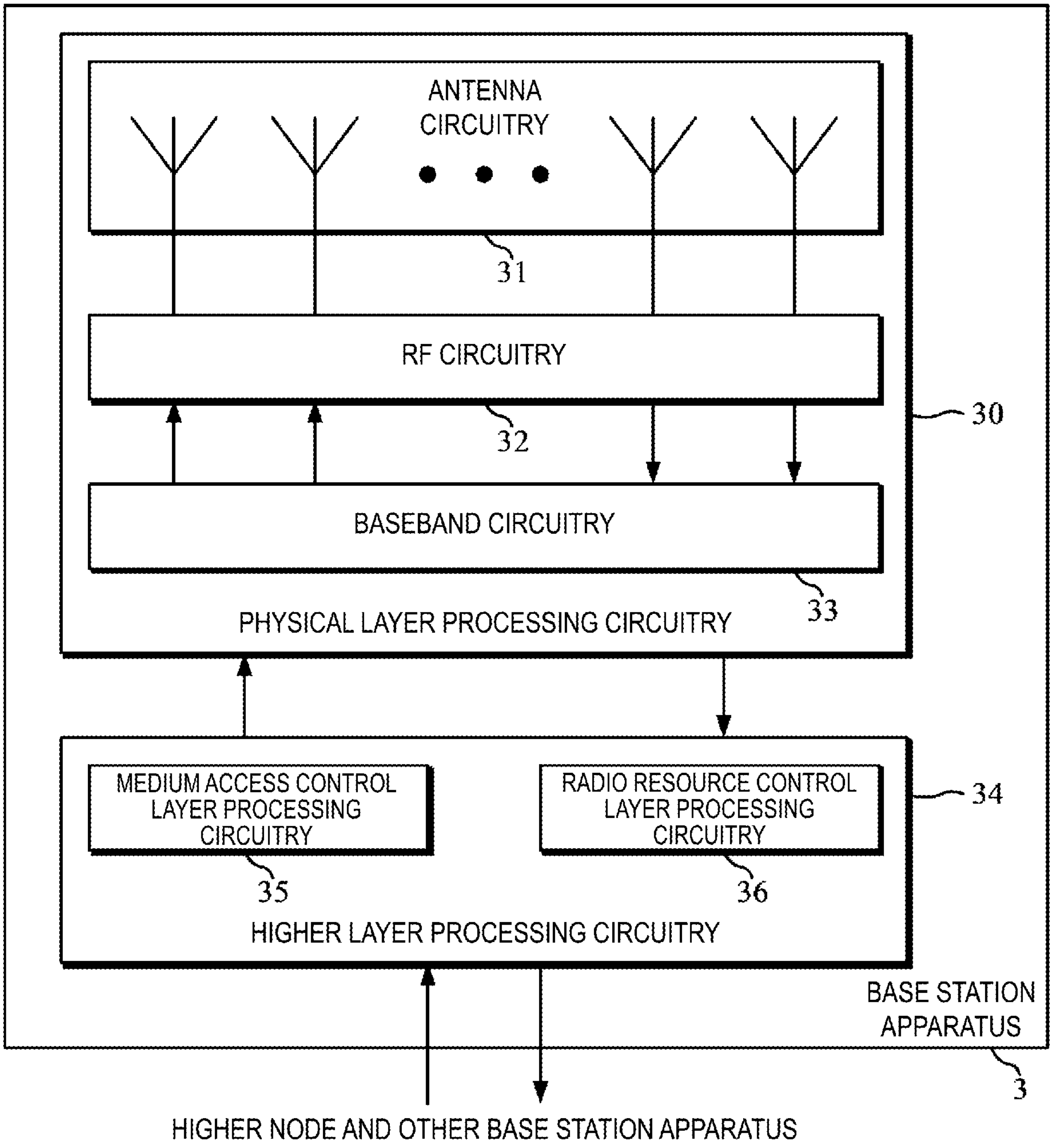
FIG. 3 is a schematic block diagram illustrating a configuration example of a base station apparatus according to an aspect of the present embodiment.

FIG. 3 is a schematic block diagram illustrating a configuration example of the base station apparatus 3 according to an aspect of the present embodiment. As illustrated in FIG. 3, the base station apparatus 3 includes a part or all of a physical layer processing circuitry (radio transmission and/or reception circuitry) 30 and/or a Higher layer processing circuitry 34. The physical layer processing circuitry 30 includes a part or all of an antenna circuitry 31, a Radio Frequency (RF) circuitry 32, and a baseband circuitry 33. The higher layer processing circuitry 34 includes a part or all of a medium access control layer (MAC layer) processing circuitry 35 and a Radio Resource Control (RRC) layer processing circuitry 36.

The physical layer processing circuitry 30 performs processing of the physical layer. Here, the processing of the physical layer may include some or all of generation of a baseband signal of a physical channel, generation of a baseband signal of a physical signal, detection of information conveyed by the physical channel, and detection of information conveyed by the physical signal. The processing of the physical layer may include processing of mapping a transport channel to the physical channel. Here, the baseband signal is also referred to as a time-continuous signal.

For example, the physical layer processing circuitry 30 may generate a baseband signal of the downlink physical channel. Here, a transport block delivered by a higher layer on the DL-SCH may be mapped to the downlink physical channel.

For example, the physical layer processing circuitry 30 may generate a baseband signal of the downlink physical signal.

For example, the physical layer processing circuitry 30 may attempt to detect information conveyed by the uplink physical channel. Here, a transport block included in the information conveyed by the uplink physical channel may be delivered to a higher layer on the UL-SCH.

For example, the physical layer processing circuitry 30 may attempt to detect information conveyed by the uplink physical signal.

The higher layer processing circuitry 34 performs some or all of processing operations of a Medium Access Control (MAC) layer, a Packet Data Convergence Protocol (PDCP) layer, a Radio Link Control (RLC) layer, and an RRC layer. Here, the MAC layer is also referred to as a MAC sublayer. The PDCP layer is also referred to as a PDCP sublayer. The RLC layer is also referred to as an RLC sublayer. The RRC layer is also referred to as an RRC sublayer.

The medium access control layer processing circuitry (MAC layer processing circuitry) 35 performs processing of the MAC layer. Here, the processing of the MAC layer may include a part or all of mapping between a logical channel and a transport channel, multiplexing one or multiple MAC Service Data Units (SDUs) on a transport block, decomposing a transport block delivered from the physical layer on the UL-SCH into one or multiple MAC SDUs, applying a Hybrid Automatic Repeat reQuest (HARQ) to the transport block, and processing a scheduling request.

The radio resource control layer processing circuitry 36 performs processing of the RRC layer. The processing of the RRC layer may include a part or all of management of a broadcast signal, management of an RRC connected/RRC idle state, and RRC reconfiguration.

The radio resource control layer processing circuitry 36 may manage RRC parameters used for various configurations of the terminal apparatus 1. For example, the radio resource control layer processing circuitry 36 may include the RRC parameter in an RRC message on a certain logical channel and transmit the RRC message to the terminal apparatus 1. Here, the RRC message may be mapped to any of a Broadcast Control CHannel (BCCH), a Common Control CHannel (CCCH), and a Dedicated Control CHannel (DCCH).

The radio resource control layer processing circuitry 36 may determine the RRC parameter to be transmitted to the terminal apparatus 1, based on the RRC parameter included in the RRC message transmitted from the terminal apparatus 1. Here, the RRC message transmitted from the terminal apparatus 1 may be related to a function information report of the terminal apparatus 1.

The physical layer processing circuitry 30 may perform a part or all of modulation processing, coding processing, and transmission processing. The physical layer processing circuitry 30 may generate a physical signal based on a part or all of coding processing, modulation processing, and baseband signal generation processing for a transport block. The physical layer processing circuitry 30 may map a physical signal to a certain BWP. The physical layer processing circuitry 30 may transmit a generated physical signal.

The physical layer processing circuitry 30 may perform one or both of demodulation processing and decoding processing. The physical layer processing circuitry 30 may deliver, to the higher layer on the UL-SCH, a transport block included in the information detected based on the demodulation processing and the decoding processing on a received physical signal.

In a case that carrier sense is requested to be performed in the band of the serving cell, the physical layer processing circuitry 30 may perform the carrier sense prior to the transmission of the physical signal.

The RF circuitry 32 may convert a signal received via the antenna circuitry 31 into a baseband signal to remove unnecessary frequency components from the signal. The RF circuitry 32 outputs the baseband signal to the baseband circuitry 33.

The baseband circuitry 33 may digitize the baseband signal received from the RF circuitry 32. The baseband circuitry 33 may remove a portion of the digitized baseband signal corresponding to a Cyclic Prefix (CP). The baseband circuitry 33 may perform a Fast Fourier Transform (FFT) on the baseband signal from which the CP has been removed to extract a signal in the frequency domain.

The baseband circuitry 33 may generate a baseband signal by performing Inverse Fast Fourier Transform (IFFT) on the physical signal. The baseband circuitry 33 may add the CP to the generated baseband signal. The baseband circuitry 33 may convert the baseband signal to which the CP is added into an analog signal. The baseband circuitry 33 may output the converted analog baseband signal to the RF circuitry 32.

The RF circuitry 32 may remove unnecessary frequency components from the baseband signal received from the baseband circuitry 33. The RF circuitry 32 may generate an RF signal by up converting the baseband signal to a carrier frequency. The RF circuitry 32 may transmit an RF signal via the antenna circuitry 31. The RF circuitry 32 may have a function of controlling transmission power.

For the terminal apparatus 1, one or multiple serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which a random access procedure is performed by the terminal apparatus 1.

The SCell may be included in either of the MCG or the SCG.

A serving cell group (cell group) is a general term for the MCG, SCG, and PUCCH cell group. The serving cell group may include one or multiple serving cells (or component carriers).

One or multiple serving cells (or component carriers) included in the serving cell group may be operated by means of carrier aggregation.

One or multiple downlink BWPs may be configured for the terminal apparatus 1. One or multiple uplink BWPs may be configured for the terminal apparatus 1.

Among one or multiple downlink BWPs configured for the terminal apparatus 1, one downlink BWP may be configured as an active downlink BWP (or one downlink BWP may be activated). Among one or multiple uplink BWPs configured for the terminal apparatus 1, one uplink BWP may be configured as an active uplink BWP (or one uplink BWP may be activated).

The physical layer processing circuitry 30 may attempt to transmit the PDSCH, the PDCCH, and the CSI-RS on the active downlink BWP. A physical layer processing circuitry 10 may attempt to receive the PDSCH, the PDCCH, and the CSI-RS on the active downlink BWP. The physical layer processing circuitry 30 may attempt to receive the PUCCH and the PUSCH on the active uplink BWP. The physical layer processing circuitry 10 may attempt to transmit the PUCCH and the PUSCH on the active uplink BWP. Here, the active downlink BWP and the active uplink BWP are generally referred to as active BWPs.

The physical layer processing circuitry 30 need not attempt to transmit the PDSCH, the PDCCH, and the CSI-RS on an inactive downlink BWP (downlink BWP that is not the active downlink BWP). The physical layer processing circuitry 10 need not attempt to receive the PDSCH, the PDCCH, and the CSI-RS on the inactive downlink BWP. The physical layer processing circuitry 30 need not attempt to transmit the PUCCH and the PUSCH on an inactive uplink BWP (uplink BWP that is not the active uplink BWP). The physical layer processing circuitry 10 need not attempt to transmit the PUCCH and the PUSCH on the inactive uplink BWP. Here, the inactive downlink BWP and the inactive uplink BWP are generally referred to as inactive BWPs.

Downlink BWP switch is a procedure for deactivating one active downlink BWP of a certain serving cell and activating any one of the inactive downlink BWPs of the certain serving cell. The downlink BWP switch may be controlled by any one of the physical layer, the MAC layer, and the RRC layer.

Uplink BWP switch is used to deactivate one active uplink BWP of a certain serving cell and to activate any one of the inactive uplink BWPs of the certain serving cell. The uplink BWP switch may be controlled by any one of the physical layer, the MAC layer, or the RRC layer.

Among one or multiple downlink BWPs configured for the terminal apparatus 1, two or more downlink BWPs need not be configured as active downlink BWPs. For a certain component carrier, at certain time, one downlink BWP may be active.

Among one or multiple uplink BWPs configured for the terminal apparatus 1, two or more uplink BWPs need not be configured for the active uplink BWP. For a certain component carrier, at certain time, one uplink BWP may be active.

For each downlink component carrier, one downlink BWP may be configured as an active BWP. In other words, for a certain downlink component carrier, two or more downlink BWPs need not be configured as active downlink BWPs.

For each uplink component carrier, one uplink BWP may be configured as an active BWP. In other words, for a certain uplink component carrier, two or more uplink BWPs need not be configured as active uplink BWPs.

Figure 4:
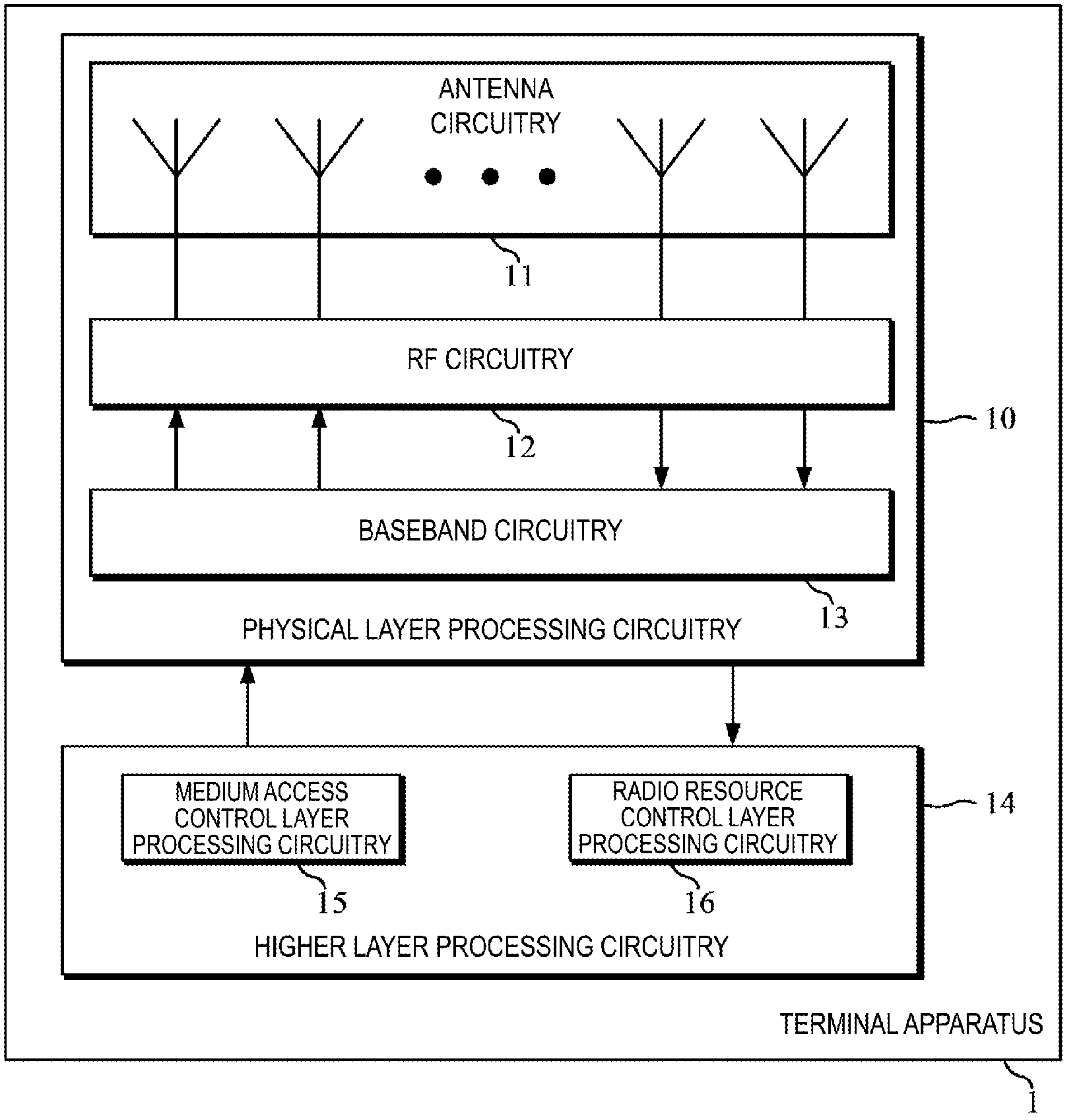
FIG. 4 is a schematic block diagram illustrating a configuration example of a terminal apparatus according to an aspect of the present embodiment.

FIG. 4 is a schematic block diagram illustrating a configuration example of the terminal apparatus 1 according to an aspect of the present embodiment. As illustrated in FIG. 4, the terminal apparatus 1 includes a part or all of the physical layer processing circuitry (radio transmission and/or reception circuitry) 10 and a higher layer processing circuitry 14. The radio transmission and/or reception circuitry 10 includes a part or all of an antenna circuitry 11, an RF circuitry 12, and a baseband circuitry 13. The higher layer processing circuitry 14 includes at least a part or all of a medium access control layer processing circuitry 15 and a radio resource control layer processing circuitry 16.

The physical layer processing circuitry 10 performs processing of the physical layer.

For example, the physical layer processing circuitry 10 may generate a baseband signal of the uplink physical channel. Here, the transport block delivered by the higher layer on the UL-SCH may be mapped to the uplink physical channel.

For example, the physical layer processing circuitry 10 may generate a baseband signal of the uplink physical signal.

For example, the physical layer processing circuitry 10 may attempt to detect information conveyed by the downlink physical channel. Here, a transport block included in the information carried by the downlink physical channel may be delivered to the higher layer on the DL-SCH.

For example, the physical layer processing circuitry 10 may attempt to detect information conveyed by the downlink physical signal.

The higher layer processing circuitry 14 performs some or all of processing operations of a Medium Access Control (MAC) layer, a Packet Data Convergence Protocol (PDCP) layer, a Radio Link Control (RLC) layer, and an RRC layer.

The medium access control layer processing circuitry (MAC layer processing circuitry) 15 performs processing of the MAC layer.

The radio resource control layer processing circuitry 16 performs processing of the RRC layer.

The radio resource control layer processing circuitry 16 may manage the RRC parameter transmitted from the base station apparatus 3. For example, the radio resource control layer processing circuitry 16 may acquire the RRC parameter included in the RRC message on a certain logical channel and set the acquired RRC parameter in a storage area of the terminal apparatus 1. The RRC parameter set in the storage area of the terminal apparatus 1 may be provided to a lower layer.

The radio resource control layer processing circuitry 16 may include, in the RRC message, function information generated based on the function included in the terminal apparatus 1 and transmit the RRC message to the base station apparatus 3.

The physical layer processing circuitry 10 may perform a part or all of modulation processing, coding processing, and transmission processing. The physical layer processing circuitry 10 may generate a physical signal based on a part or all of coding processing, modulation processing, and baseband signal generation processing for a transport block. The physical layer processing circuitry 10 may map a physical signal to a certain BWP. The physical layer processing circuitry 10 may transmit the generated physical signal.

The physical layer processing circuitry 10 may perform one or both of demodulation processing and decoding processing. The physical layer processing circuitry 10 may deliver, to the higher layer on the DL-SCH, a transport block included in the information detected based on the demodulation processing and the decoding processing on the received physical signal.

In a case that carrier sense is requested to be performed in the band of the serving cell, the physical layer processing circuitry 10 may perform the carrier sense prior to the transmission of the physical signal.

The RF circuitry 12 may convert a signal received via the antenna circuitry 11 into a baseband signal to remove unnecessary frequency components from the signal. The RF circuitry 12 outputs the baseband signal to the baseband circuitry 13.

The baseband circuitry 13 may digitize the baseband signal received from the RF circuitry 12. The baseband circuitry 13 may remove a portion of the digitized baseband signal corresponding to a Cyclic Prefix (CP). The baseband circuitry 13 may perform Fast Fourier Transform (FFT) on the baseband signal from which the CP has been removed to extract a signal in the frequency domain.

The baseband circuitry 13 may generate a baseband signal by performing Inverse Fast Fourier Transform (IFFT) on the physical signal. The baseband circuitry 13 may add the CP to the generated baseband signal. The baseband circuitry 13 may convert the baseband signal to which the CP is added into an analog signal. The baseband circuitry 13 may output the converted analog baseband signal to the RF circuitry 12.

The RF circuitry 12 may remove unnecessary frequency components from the baseband signal received from the baseband circuitry 13. The RF circuitry 12 may generate an RF signal by up converting the baseband signal to the carrier frequency. The RF circuitry 12 may transmit an RF signal via the antenna circuitry 31. The RF circuitry 12 may have a function of controlling transmission power.

The physical signal will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for conveying information generated in a higher layer. The uplink physical channel may be a physical channel used in the uplink component carrier. The uplink physical channel may be transmitted by the physical layer processing circuitry 10. The uplink physical channel may be received by the physical layer processing circuitry 30. In the uplink of the radio communication system according to an aspect of the present embodiment, a part or all of the following uplink physical channels may be used.

Physical Uplink Control CHannel (PUCCH)
Physical Uplink Shared CHannel (PUSCH)
Physical Random Access CHannel (PRACH)

The PUCCH may be transmitted for conveying (delivering, transmitting) Uplink Control Information (UCI). The uplink control information may be mapped to the PUCCH. The physical layer processing circuitry 10 may transmit the PUCCH to which the uplink control information is mapped. The physical layer processing circuitry 30 may receive the PUCCH to which the uplink control information is mapped.

The uplink control information (uplink control information bit, uplink control information sequence, uplink control information type) includes a part or all of Channel State Information (CSI), a Scheduling Request (SR), and Hybrid Automatic Repeat request ACKnowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as a HARQ-ACK information bit or a HARQ-ACK information sequence.

The HARQ-ACK information may include a HARQ-ACK bit corresponding to a Transport block (TB). A certain HARQ-ACK bit may indicate an acknowledgement (ACK) or a negative-acknowledgement (NACK) corresponding to the transport block. The ACK may indicate that decoding of the transport block has been decoded successfully. The NACK may indicate that decoding of the transport block has not been decoded successfully. The HARQ-ACK information may include one or multiple HARQ-ACK bits.

A HARQ-ACK for the transport block is referred to as a HARQ-ACK for the PDSCH. Here, the "HARQ-ACK for the PDSCH" indicates the HARQ-ACK for the transport block included in the PDSCH.

The scheduling request may be used for requesting resources of the UL-SCH for new transmission. The scheduling request bit may be used for indicating either of a positive SR or a negative SR. The scheduling request bit indicating the positive SR is also referred to as "the positive SR being conveyed". The positive SR may indicate that the medium access control layer processing circuitry 15 requests resources of the UL-SCH for initial transmission. The scheduling request bit indicating the negative SR is also referred to as "the negative SR being transmitted". The negative SR may indicate that the medium access control layer processing circuitry 15 requests no resources of the UL-SCH for initial transmission.

Channel state information may include a part or all of a Channel Quality Indicator (CQI), a Precoder Matrix Indicator (PMI), and a Rank Indicator (RI). The CQI is an indicator related to quality (for example, propagation strength) of a propagation path or quality of a physical channel, and the PMI is an indicator related to a precoder. The RI is an indicator related to a transmission rank (or the number of transmission layers).

The channel state information is an indicator related to a reception state of a physical signal (for example, CSI-RS) used for channel measurement. The channel state information may be determined by the terminal apparatus 1 based on the reception state assumed by the physical signal used for channel measurement. Channel measurement may include interference measurement.

The PUCCH may have a certain PUCCH format. Here, the PUCCH format may be the form of processing in the physical layer for the PUCCH. The PUCCH format may be the form of information conveyed by using the PUCCH.

The PUSCH may be transmitted for conveying one or both of the uplink control information and the transport block. The PUSCH may be used for conveying one or both of the uplink control information and the transport block. The terminal apparatus 1 may transmit the PUSCH to which one or both of the uplink control information and the transport block are mapped. The base station apparatus 3 may receive the PUSCH to which one or both of the uplink control information and the transport block are mapped.

The PRACH may be transmitted for conveying the index of a random access preamble. The terminal apparatus 1 may transmit the PRACH. The base station apparatus 3 may receive the PRACH. The terminal apparatus 1 may transmit the random access preamble on the PRACH. The base station apparatus 3 may receive the random access preamble on the PRACH.

The uplink physical signal may correspond to a set of resource elements. The uplink physical signal need not be used to convey information generated in a higher layer. Note that the uplink physical signal may be used to convey information generated in a physical layer. The uplink physical signal may be a physical signal used in the uplink component carrier. The physical layer processing circuitry 10 may transmit the uplink physical signal. The physical layer processing circuitry 30 may receive the uplink physical signal. In the uplink of the radio communication system according to an aspect of the present embodiment, a part or all of the following uplink physical signals may be used.

UpLink Demodulation Reference Signal (UL DMRS)
Sounding Reference Signal (SRS)
UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS related to the PUSCH, DMRS included in the PUSCH, DMRS corresponding to the PUSCH) may be given based on a set of antenna ports for the PUSCH. For example, the set of antenna ports of the DMRS for the PUSCH may be the same as a set of antenna ports of the PUSCH.

A propagation path of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

A propagation path of the PUCCH may be inferred from the DMRS for the PUCCH.

The downlink physical channel may correspond to a set of resource elements for conveying information generated in a higher layer. The downlink physical channel may be a physical channel used in a downlink component carrier. The physical layer processing circuitry 30 may transmit the downlink physical channel. The physical layer processing circuitry 10 may receive the downlink physical channel. In the downlink of the radio communication system according to an aspect of the present embodiment, a part or all of the following downlink physical channels may be used.

Physical Broadcast Channel (PBCH)
Physical Downlink Control Channel (PDCCH)
Physical Downlink Shared Channel (PDSCH)

The PBCH may be transmitted for conveying one or both of a Master Information Block (MIB) and physical layer control information. Here, the physical layer control information is information generated in the physical layer. The MIB is an RRC message delivered by the higher layer on a Broadcast Control CHannel (BCCH).

The PDCCH may be used for transmitting Downlink Control Information (DCI). The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may be transmitted with a DCI format. Note that the DCI format may also be interpreted to be in the format of downlink control information. The DCI format may be interpreted as a set of downlink control information set to a certain format of downlink control information.

The base station apparatus 3 may notify the terminal apparatus 1 of the downlink control information by using the PDCCH in the DCI format. The terminal apparatus 1 may monitor the PDCCH in order to acquire the downlink control information. Note that the DCI format and the downlink control information may be described as equivalent unless otherwise specified. For example, the base station apparatus 3 may include the downlink control information in the DCI format and transmit the DCI format to the terminal apparatus 1. The terminal apparatus 1 may control the physical layer processing circuitry 10 by using the downlink control information included in the detected DCI format.

A DCI format 0_0, a DCI format 0_1, a DCI format 1_0, and a DCI format 1_1 are DCI formats. An uplink DCI format is a general term for the DCI format 0_0 and the DCI format 0_1. A downlink DCI format is a general term for the DCI format 1_0 and the DCI format 1_1.

The DCI format 0_0 is used for scheduling of the PUSCH mapped to a certain cell. The DCI format 0_0 may include a part or all of fields listed from 1A to 1E.

1A) Identifier field for DCI formats

1B) Frequency domain resource assignment field

1C) Time domain resource assignment field

1D) Frequency hopping flag field

1E) Modulation and Coding Scheme (MCS) field

The identifier field for DCI formats may indicate whether the DCI format including the identifier field for DCI formats is an uplink DCI format or a downlink DCI format. In other words, each of the uplink DCI format and the downlink DCI format may include the identifier field for DCI formats. Here, the identifier field for DCI formats included in the DCI format 0_0 may indicate 0.

The frequency domain resource assignment field included in the DCI format 0_0 may be used for indicating assignment of frequency resources for the PUSCH scheduled by the DCI format 0_0.

The time domain resource assignment field included in the DCI format 0_0 may be used for indicating assignment of time resources for the PUSCH scheduled by the DCI format 0_0.

The frequency hopping flag field may be used to indicate whether frequency hopping is to be applied to the PUSCH scheduled by the DCI format 0_0.

An MCS field included in the DCI format 0_0 may be used for indicating one or both of a modulation scheme for the PUSCH scheduled by the DCI format 0_0 and a target coding rate scheduled by the DCI format 0_1. The target coding rate may be a target coding rate for the transport block mapped to the PUSCH. The Transport Block Size (TBS) of the PUSCH mapped to the PUSCH may be determined based on a part or all of the target coding rate and the modulation scheme for the PUSCH.

The DCI format 0_0 need not include a field used for a CSI request.

The DCI format 0_0 need not include a carrier indicator field. In other words, for the uplink component carrier to which the PUSCH scheduled by the DCI format 0_0 is mapped, the serving cell to which this uplink component carrier belongs may be the same as the serving cell of the downlink component carrier to which the PDCCH including the DCI format 0_0 is mapped. Based on detection of the DCI format 0_0 in a certain downlink component carrier of a certain serving cell, the terminal apparatus 1 may recognize that the PUSCH scheduled by the DCI format 0_0 is mapped to the uplink component carrier of the certain serving cell.

The DCI format 0_0 need not include the BWP field. Here, the DCI format 0_0 may be a DCI format for scheduling the PUSCH without changing the active uplink BWP. The terminal apparatus 1 may recognize that the PUSCH is transmitted without switching the active uplink BWP based on detection of the DCI format 0_0 used for the scheduling of the PUSCH.

The DCI format 0_1 is used for scheduling of the PUSCH mapped to a certain cell. The DCI format 0_1 includes a part or all of fields listed from 2A to 2H.

2A) Identifier field for DCI formats

2B) Frequency domain resource assignment field

2C) Uplink time domain resource assignment field

2D) Frequency hopping flag field

2E) MCS field

2F) CSI request field

2G) BWP field

2H) Carrier indicator field

The identifier field for DCI formats included in the DCI format 0_1 may indicate 0.

The frequency domain resource assignment field included in the DCI format 0_1 may be used for indicating assignment of frequency resources for the PUSCH scheduled by the DCI format 0_1.

The time domain resource assignment field included in the DCI format 0_1 may be used for indicating assignment of time resources for the PUSCH scheduled by the DCI format 0_1.

An MCS field included in the DCI format 0_1 may be used for indicating one or both of a modulation scheme for the PUSCH scheduled by the DCI format 0_1 and the target coding rate for the PUSCH scheduled by the DCI format 0_1.

The BWP field of the DCI format 0_1 may be used for indicating an uplink BWP to which the PUSCH scheduled by the DCI format 0_1 is mapped. In other words, the DCI format 0_1 may or may not be accompanied by a change in the active uplink BWP. The terminal apparatus 1 may recognize the uplink BWP to which the PUSCH is mapped based on detection of the DCI format 0_1 used for scheduling of the PUSCH.

The DCI format 0_1 not including the BWP field may be a DCI format for scheduling the PUSCH without changing the active uplink BWP. The terminal apparatus 1 may recognize that the PUSCH is transmitted without switching the active uplink BWP based on detection of the DCI format 0_1 which is the DCI format 0_1 used for the scheduling of the PUSCH and does not include the BWP field.

In a case that the BWP field is included in the DCI format 0_1 but the terminal apparatus 1 does not support the function of switching the BWP according to the DCI format 0_1, the terminal apparatus 1 may ignore the BWP field. In other words, the terminal apparatus 1 which does not support the function of switching the BWP may recognize that the PUSCH is transmitted without switching the active uplink BWP based on detection of the DCI format 0_1 which is the DCI format 0_1 used for the scheduling of the PUSCH and includes the BWP field. Here, in a case that the function of switching the BWP is supported, the radio resource control layer processing circuitry 16 may include, in the RRC message, function information indicating that the function of switching the BWP is supported.

The CSI request field may be used for indicating the report of the CSI.

In a case that the DCI format 0_1 includes the carrier indicator field, the carrier indicator field may be used for indicating the serving cell of the uplink component carrier to which the PUSCH is mapped. Based on detection of the DCI format 0_1 in the downlink component carrier of a certain serving cell, the terminal apparatus 1 may recognize that the PUSCH scheduled by the DCI format 0_1 is mapped to the uplink component carrier of the serving cell indicated by a carrier indicator field included in the DCI format 0_1.

In a case that the DCI format 0_1 does not include the carrier indicator field, then for the uplink component carrier to which the PUSCH scheduled by the DCI format 0_1 is mapped, the serving cell to which this uplink component carrier belongs may be the same as the serving cell of the downlink component carrier to which the PDCCH including the DCI format 0_1 is mapped. Based on detection of the DCI format 0_1 in a certain downlink component carrier of a certain serving cell, the terminal apparatus 1 may recognize that the PUSCH scheduled by the DCI format 0_1 is mapped to the uplink component carrier of the certain serving cell.

The DCI format 1_0 is used for scheduling of the PDSCH mapped to a certain cell. The DCI format 1_0 includes a part or all of 3A to 3F.

3A) Identifier field for DCI formats

3B) Frequency domain resource assignment field

3C) Time domain resource assignment field

3D) MCS field

3E) PDSCH_HARQ feedback timing indicator field (PDSCH to HARQ feedback timing indicator field)

3F) PUCCH resource indicator field

The identifier field for DCI formats included in the DCI format 1_0 may indicate 1.

The frequency domain resource assignment field included in the DCI format 1_0 may be used for indicating assignment of frequency resources for the PDSCH scheduled by the DCI format.

The time domain resource assignment field included in the DCI format 1_0 may be used for indicating assignment of time resources for the PDSCH scheduled by the DCI format.

The MCS field included in the DCI format 1_0 may be used for indicating one or both of the modulation scheme for the PDSCH scheduled by the DCI format and the target coding rate for the PDSCH scheduled by the DCI format. The target coding rate may be a target coding rate for the transport block mapped to the PDSCH. The Transport Block Size (TBS) of the PDSCH mapped to the PDSCH may be determined based on one or both of the target coding rate and the modulation scheme for the PDSCH.

The PDSCH_HARQ feedback timing indicator field may be used for indicating an offset from the slot including the last OFDM symbol of the PDSCH to the slot including the first OFDM symbol of the PUCCH.

The PUCCH resource indicator field may be used to indicate a resource of the PUCCH.

The DCI format 1_0 need not include the carrier indicator field. In other words, the downlink component carrier to which the PDSCH scheduled by using a DCI format 1_0 is mapped may be the same as the downlink component carrier to which the PDCCH including the DCI format 1_0 is mapped. Based on detection of the DCI format 1_0 in a certain downlink component carrier, the terminal apparatus 1 may recognize that the PDSCH scheduled by the DCI format 1_0 is mapped to the downlink component carrier.

The DCI format 1_0 need not include the BWP field. Here, DCI format 1_0 may be a DCI format for scheduling the PDSCH without changing the active downlink BWP. The terminal apparatus 1 may recognize that the PDSCH is received without switching the active downlink BWP based on detection of the DCI format 1_0 used in the scheduling of the PDSCH.

The DCI format 1_1 is used for scheduling of the PDSCH mapped to a certain cell. The DCI format 1_1 includes a part or all of 4A to 4I.

4A) Identifier field for DCI formats

4B) Frequency domain resource assignment field

4C) Time domain resource assignment field

4E) MCS field

4F) PDSCH_HARQ feedback timing indicator field

4G) PUCCH resource indicator field

4H) BWP field

4I) Carrier indicator field

The identifier field for DCI formats included in the DCI format 1_1 may indicate 1.

The frequency domain resource assignment field included in the DCI format 1_1 may be used for indicating assignment of frequency resources for the PDSCH scheduled by the DCI format 1_1.

The time domain resource assignment field included in the DCI format 1_1 may be used for indicating assignment of time resources for the PDSCH scheduled by the DCI format 1_1.

The MCS field included in the DCI format 1_1 may be used for indicating one or both of the modulation scheme for the PDSCH scheduled by the DCI format 1_1 and the target coding rate for the PDSCH scheduled by the DCI format 1_1.

In a case that the DCI format 1_1 includes the PDSCH_HARQ feedback timing indicator field, the PDSCH_HARQ feedback timing indicator field may be used for indicating an offset from the slot including the last OFDM symbol of the PDSCH to the slot including the first OFDM symbol of the PUCCH. In a case that the DCI format 1_1 does not include the PDSCH_HARQ feedback timing indicator field, a parameter indicating an offset from the slot including the last OFDM symbol of the PDSCH to the slot including the first OFDM symbol of the PUCCH may be provided by an RRC layer.

The PUCCH resource indicator field may be used to indicate a resource of the PUCCH.

The BWP field of the DCI format 1_1 may be used to indicate the downlink BWP to which the PDSCH scheduled by the DCI format 1_1 is mapped. In other words, the DCI format 1_1 may or may not be accompanied by a change in the active downlink BWP. The terminal apparatus 1 may recognize the downlink BWP to which the PDSCH is mapped based on detection of the DCI format 1_1 used for the scheduling of the PDSCH.

The DCI format 1_1 not including the BWP field may be a DCI format for scheduling the PDSCH without changing the active downlink BWP. The terminal apparatus 1 may recognize that the PDSCH is received without switching the active downlink BWP based on detection of the DCI format 1_1 which is used for the scheduling of the PDSCH and does not include the BWP field.

In a case that the DCI format 1_1 includes the BWP field but the terminal apparatus 1 does not support the function of switching the BWP according to the DCI format 1_1, the terminal apparatus 1 may ignore the BWP field. In other words, the terminal apparatus 1 which does not support the function of switching the BWP may recognize that the PDSCH is received without switching the active downlink BWP based on detection of the DCI format 1_1 which is used for the scheduling of the PDSCH and includes the BWP field. Here, in a case that the function of switching the BWP is supported, the radio resource control layer processing circuitry 16 may include, in the RRC message, function information indicating that the function of switching the BWP is supported.

In a case that the DCI format 1_1 includes the carrier indicator field, the carrier indicator field may be used for indicating the serving cell of the downlink component carrier to which the PDSCH scheduled by the DCI format 1_1 is mapped. Based on detection of the DCI format 1_1 in the downlink component carrier of a certain serving cell, the terminal apparatus 1 may recognize that the PDSCH scheduled by the DCI format 1_1 is mapped to the downlink component carrier of the serving cell indicated by the carrier indicator field included in the DCI format 1_1.

In a case that the DCI format 1_1 does not include the carrier indicator field, the downlink component carrier to which the PDSCH scheduled by the DCI format 1_1 is mapped may be the same as the downlink component carrier to which the PDCCH including the DCI format 1_1 is mapped. Based on detection of the DCI format 1_1 in a certain downlink component carrier, the terminal apparatus 1 may recognize that the PDSCH scheduled by the DCI format 1_1 is mapped to the downlink component carrier.

The PDSCH may be used for conveying the transport block. The PDSCH may be used for conveying the transport block. The transport block may be mapped to the PDSCH. The base station apparatus 3 may transmit the PDSCH to which the transport block is mapped. The terminal apparatus 1 may receive the PDSCH to which the transport block is mapped.

The downlink physical signal may correspond to a set of resource elements. The downlink physical signal need not be used to convey information generated in the higher layer. Note that the downlink physical signal may be used to convey information generated in the physical layer. The downlink physical signal may be a physical signal used in the downlink component carrier. The physical layer processing circuitry 10 may transmit the downlink physical signal. The physical layer processing circuitry 30 may receive the downlink physical signal. In the downlink of the radio communication system according to an aspect of the present embodiment, at least a part or all of the following downlink physical signals may be used.

Synchronization signal (SS)

DownLink DeModulation Reference Signal (DL DMRS)

Channel State Information-Reference Signal (CSI-RS)

DownLink Phase Tracking Reference Signal (DL PTRS)

The synchronization signal may be used for the terminal apparatus 1 to take synchronization in one or both of the frequency domain and the time domain in the downlink. The synchronization signal is a general term for the Primary Synchronization Signal (PSS) and the Secondary Synchronization Signal (SSS).

The PSS, the SSS, the PBCH, and the antenna port of the DMRS for the PBCH may be the same.

The PBCH over which the symbol of the PBCH on a certain antenna port is conveyed may be inferred from the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. For example, the set of antenna ports of the DMRS for the PDSCH may be the same as the set of antenna ports for the PDSCH.

A propagation path of the PDSCH may be inferred from the DMRS for the PDSCH. In a case that a set of resource elements in which the symbol of a certain PDSCH is conveyed and a set of resource elements in which the symbol of the DMRS for the certain PDSCH is conveyed are included in the same Precoding Resource Group (PRG), the PDSCH over which the symbol of the PDSCH on a certain antenna port is conveyed may be inferred from the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

A propagation path of the PDCCH may be inferred from the DMRS for the PDCCH. In a case that the same precoder is (assumed to be) applied to a set of resource elements in which the symbol of a certain PDCCH is conveyed and a set of resource elements in which the symbol of the DMRS for the certain PDCCH is conveyed, the PDCCH over which the symbol of the PDCCH on a certain antenna port is conveyed may be inferred from the DMRS for the PDCCH.

A Broadcast CHannel (BCH), an Uplink-Shared CHannel (UL-SCH), and a Downlink-Shared CHannel (DL-SCH) are transport channels.

The BCH of the transport layer may be mapped to the PBCH of the physical layer. In other words, a transport block delivered by the higher layer on the BCH of the transport layer may be mapped to the PBCH of the physical layer. The UL-SCH of the transport layer may be mapped to the PUSCH of the physical layer. In other words, a transport block delivered by the higher layer on the UL-SCH of the transport layer may be mapped to the PUSCH of the physical layer. The DL-SCH of the transport layer may be mapped to the PDSCH of the physical layer. In other words, a transport block delivered by the higher layer on the DL-SCH of the transport layer may be mapped to the PDSCH of the physical layer.

The transport layer may apply the Hybrid Automatic Repeat reQuest (HARQ) to the transport block.

A Broadcast Control CHannel (BCCH), a Common Control CHannel (CCCH), and a Dedicated Control CHannel (DCCH) are logical channels. For example, the BCCH may be used for delivery of an RRC message including an MIB or an RRC message including system information. The CCCH may be used for transmitting an RRC message including an RRC parameter that is common to multiple terminal apparatuses 1. Here, the CCCH may be, for example, used for the terminal apparatus 1 that is not in a state of RRC connection. The DCCH may be used for transmitting an RRC message dedicated to a certain terminal apparatus 1. Here, the DCCH may be, for example, used for the terminal apparatus 1 that is in a state of RRC connection.

The RRC parameter common to the multiple terminal apparatuses 1 is also referred to as a common RRC parameter. Here, the common RRC parameter may be defined as a parameter specific to the serving cell. Here, the parameter specific to the serving cell may be a parameter common to terminal apparatuses configured with the serving cell (for example, the terminal apparatuses 1-A, 1-B, and 1-C).

For example, an RRC message delivered to the BCCH may include the common RRC parameter. For example, an RRC message delivered to the DCCH may include the common RRC parameter.

Among certain RRC parameters, an RRC parameter different from the common RRC parameter is also referred to as a dedicated RRC parameter. Here, the dedicated RRC parameter can provide a dedicated RRC parameter to the terminal apparatus 1-A configured with the serving cell. In other words, the dedicated RRC parameter is an RRC parameter capable of providing a unique configuration to each of the terminal apparatuses 1-A, 1-B, and 1-C.

The BCCH may be mapped to the BCH or the DL-SCH. In other words, the RRC message including the information of the MIB may be delivered to the BCH. The RRC message including the system information other than the MIB may be delivered to the DL-SCH. The CCCH is mapped to the DL-SCH or the UL-SCH. In other words, the RRC message mapped to the CCCH may be delivered to the DL-SCH or the UL-SCH. The DCCH may be mapped to the DL-SCH or the UL-SCH. In other words, the RRC message mapped to the DCCH may be delivered to the DL-SCH or the UL-SCH.

Figure 5:
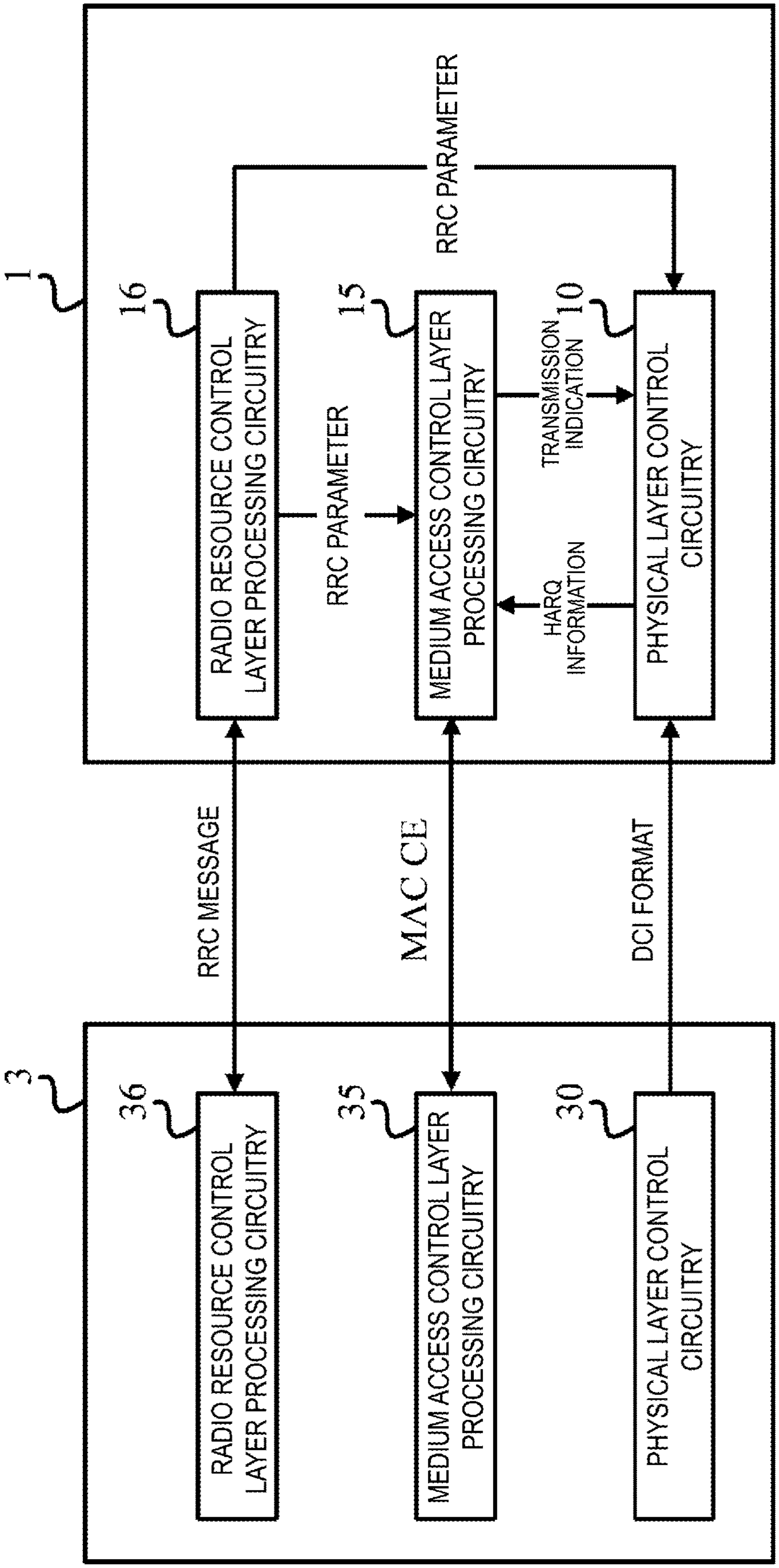
FIG. 5 is a diagram illustrating an example of a procedure related to PUSCH transmission between the terminal apparatus and the base station apparatus according to an aspect of the present embodiment.

FIG. 5 is a diagram illustrating an example of a procedure related to PUSCH transmission between the terminal apparatus 1 and the base station apparatus 3 according to an aspect of the present embodiment. As illustrated in FIG. 5, the radio resource control layer processing circuitry 36 and the radio resource control layer processing circuitry 16 exchange RRC messages. The medium access control layer processing circuitry 35 and the medium access control layer processing circuitry 15 exchange MAC CEs. The physical layer processing circuitry 30 notifies the physical layer processing circuitry 10 of the DCI format.

The physical layer processing circuitry 10 interprets the received DCI format and delivers, to the medium access control layer processing circuitry 15, a part of information obtained based on the interpretation. Here, a part of the information obtained based on the interpretation is also referred to as HARQ information. For example, the HARQ information may include at least one or both of a HARQ Process Index (HPN) and a New Data Indicator (NDI). Here, in a case that the received DCI format schedules transmission of the PUSCH, the DCI format corresponds to an uplink grant.

In some cases, the DCI format may be replaced with a random access response grant. For example, the random access response grant may be used in scheduling the initial transmission of a message 3 PUSCH in the random access procedure. Here, a PUSCH scheduled by the random access response grant in a 4-step contention-based random-access procedure is classified as the message 3 PUSCH. A PUSCH scheduled by a DCI format with a CRC sequence scrambled by a TC-RNTI in the 4-step contention-based random access procedure is classified as the message 3 PUSCH. A PUSCH scheduled by the random access response grant in a Contention-free random-access procedure is not classified as the message 3 PUSCH.

Here, a PUSCH scheduled by a fallback random access response grant in a two step contention-based random access procedure is classified as a fallback message 3 PUSCH. A PUSCH scheduled by the DCI format with the CRC sequence scrambled by the TC-RNTI in the two step contention-based random access procedure is classified as the fallback message 3 PUSCH.

Then, the medium access control layer processing circuitry 15 provides a transmission indication to the physical layer processing circuitry 10 based on the uplink grant. Here, for the transmission indication, the medium access control layer processing circuitry 15 may further refer to the RRC parameter provided by the radio resource control layer processing circuitry 16.

Then, the physical layer processing circuitry 10 transmits the PUSCH, based on the transmission indication provided by the medium access control layer processing circuitry 15. Here, in order to transmit the PUSCH, the physical layer processing circuitry 10 may further refer to an RRC parameter provided by the radio resource control layer processing circuitry 16.

Here, the RRC parameter provided by the radio resource control layer processing circuitry 16 to the medium access control layer processing circuitry 15 or the physical layer processing circuitry 10 may be a parameter managed by the radio resource control layer processing circuitry 16, based on an RRC message transmitted from the radio resource control layer processing circuitry 36.

Here, the radio resource control layer processing circuitry 36 may include, in the RRC message, an RRC parameter for determining a method of determining a transmission occasion for the PUSCH and transmit the RRC parameter to the radio resource control layer processing circuitry 16.

Figure 6:
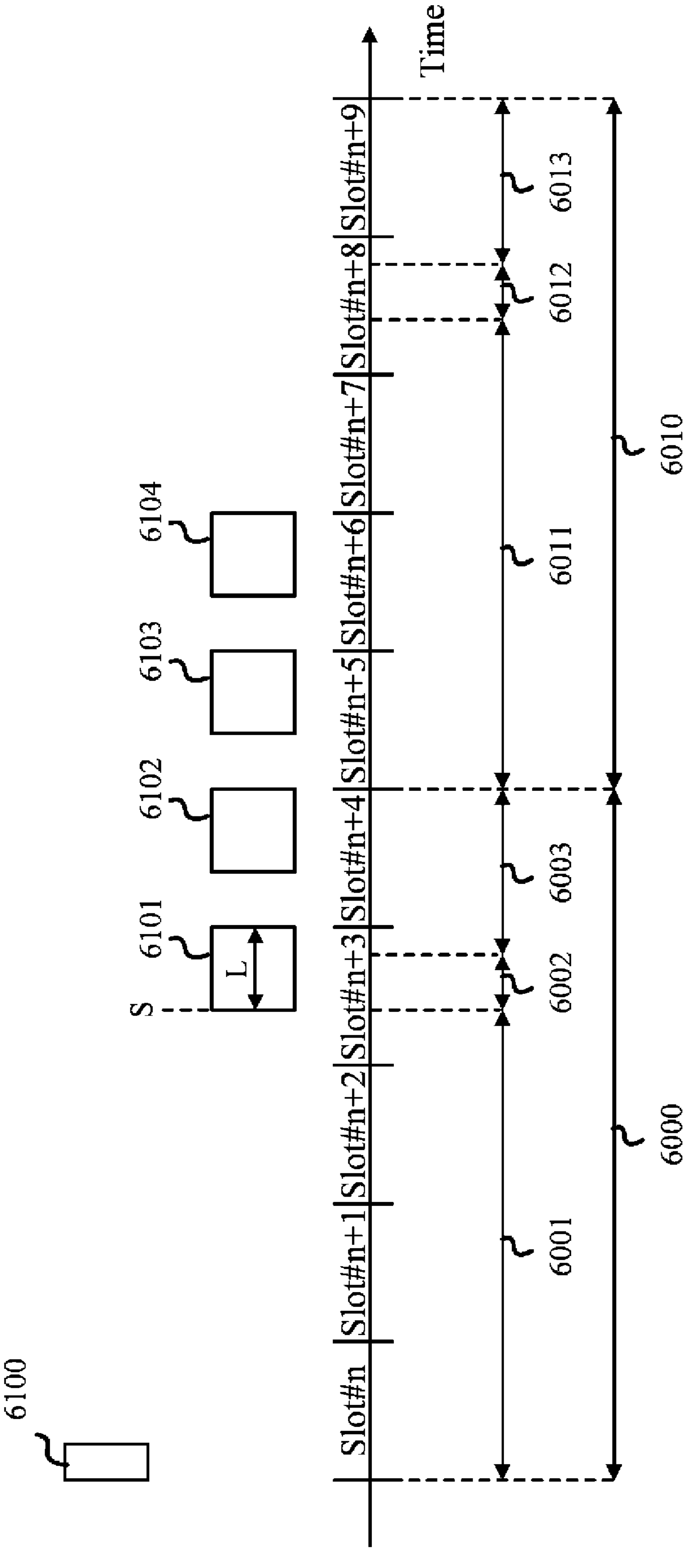
FIG. 6 is a diagram illustrating an example of PUSCH transmission according to an aspect of the present embodiment.

FIG. 6 is a diagram illustrating an example of PUSCH transmission according to an aspect of the present embodiment. Here, 6000 denotes a pattern. The pattern 6000 includes regions 6001, 6002, and 6003. 6010 denotes a pattern. Here, the patterns 6000 and 6010 have the same configuration. In other words, the pattern 6010 includes regions 6011, 6012, and 6013. The region 6001 corresponds to the region 6011. The region 6002 corresponds to the region 6012. The region 6003 corresponds to the region 6013.

In FIG. 6, the region 6001 includes time domains of slot #n, slot #n+1, and slot #n+2. The region 6001 includes a part of the time domain of the slot #n+3. The region 6001 is also referred to as a downlink region.

In FIG. 6, the region 6002 includes a part of the time domain of slot #n+3. The region 6002 is also referred to as a flexible region.

In FIG. 6, the region 6003 includes a part of the time domain of slot #n+3. The region 6003 includes the time domain of slot #n+4. The region 6003 is also referred to as an uplink region.

In FIG. 6, the region 6011 includes time domains of slot #n+5, slot #n+6, and slot #n+7. The region 6011 includes a part of the time domain of slot #n+8. The region 6011 is also referred to as a downlink region.

In FIG. 6, the region 6012 includes a part of the time domain of slot #n+8. The region 6012 is also referred to as a flexible region.

In FIG. 6, the region 6013 includes a part of the time domain of slot #n+8. The region 6013 includes the time domain of slot #n+9. The region 6013 is also referred to as an uplink region.

For example, the configuration of the downlink region may be determined based on a common RRC parameter provided by the radio resource control layer processing circuitry 16. The configuration of the flexible region may be determined based on the common RRC parameter provided by the radio resource control layer processing circuitry 16. The configuration of the uplink region may be determined based on the common RRC parameter provided by the radio resource control layer processing circuitry 16.

An OFDM symbol included in the downlink region is also referred to as a downlink symbol. An OFDM symbol included in the flexible region is also referred to as a flexible symbol. An OFDM symbol included in the uplink region is also referred to as an uplink symbol.

The flexible region is a region that can be changed based on the dedicated RRC parameter. For example, the dedicated RRC parameter may change a part of the flexible region to the downlink region. The dedicated RRC parameter may change a part of the flexible region to the uplink region.

The flexible region is a region in which a change based on information indicated by DCI format 2_0 can be made. For example, the information indicated by DCI format 2_0 may change a part of the flexible region to the downlink region. The information indicated by DCI format 2_0 can change a part of the flexible region to the uplink region.

In FIG. 6, 6100 denotes a PDCCH. Here, the DCI format included in the PDCCH 6100 is used for scheduling the PUSCH. After detecting the DCI format included in the PDCCH 6100, the terminal apparatus 1 determines a Transmission occasion for the PUSCH. Here, one of Physical slot counting or Available slot counting may be used as a method of determining the transmission occasion for the PUSCH.

FIG. 6 illustrates an example of the physical slot counting in a case that the number of repetitions K is 4. Here, in the physical slot counting, four slots from the first slot (slot #n+3) to slot #n+6 of the PUSCH are identified. One transmission occasion is mapped to each of the identified four slots. In other words, a transmission occasion 6101 is mapped to slot #n+3, a transmission occasion 6102 is mapped to slot #n+4, a transmission occasion 6103 is mapped to slot #n+5, and a transmission occasion 6104 is mapped to slot #n+6.

In other words, in the physical slot counting, the physical layer processing circuitry 10 may specify four continuous slots from the first slot of the PUSCH.

Here, the first slot of the PUSCH may be determined based on information provided by the DCI format. For example, one of the rows of one Time Domain Resource Assignment (TDRA) table may be identified by the value of the time domain resource assignment field included in the DCI format. Here, the first slot of the PUSCH may be determined based on a parameter K2 associated with the one identified row. Here, the parameter K2 may be a parameter that provides a slot offset from the slot to which the PDCCH 6100 is mapped to the first slot of the PUSCH.

At least a parameter K2 may be associated with each row of one TDRA table.

FIG. 7 is a diagram illustrating a configuration example of the TDRA table according to an aspect of the present embodiment. The TDRA table illustrated in FIG. 7 includes four rows, each row corresponding to a value. For example, in a case that the value of the time domain resource assignment field is 0, the slot offset K2 is 3, a first symbol index S is 0, a length L of the PUSCH is 14, and the number of repetitions K is 4. In this way, the base station apparatus 3 can control the time domain resource of the PUSCH by setting the value of the time domain resource assignment field to an appropriate value. The terminal apparatus 1 can specify the values of the parameter K2, SLIV, and the number of repetitions K, based on the value of the time domain resource assignment field.

Here, SLIV is defined as a parameter for determining the first symbol index S and the length L of the PUSCH. The value of SLIV may also be given by joint coding of S and L.

The first symbol index S is a parameter indicating an index of an OFDM symbol at which one transmission occasion for the PUSCH starts. The length L of the PUSCH is a parameter indicating the number of OFDM symbols in one transmission occasion for the PUSCH.

The number of repetitions K is a parameter used to determine the number of transmission occasions determined for transmission of the PUSCH.

In this way, the TDRA table may be a table used to determine some or all of the first symbol index S of the PUSCH, the length L of the PUSCH, the parameter K2, and the number of repetitions K of the PUSCH.

Figure 8:
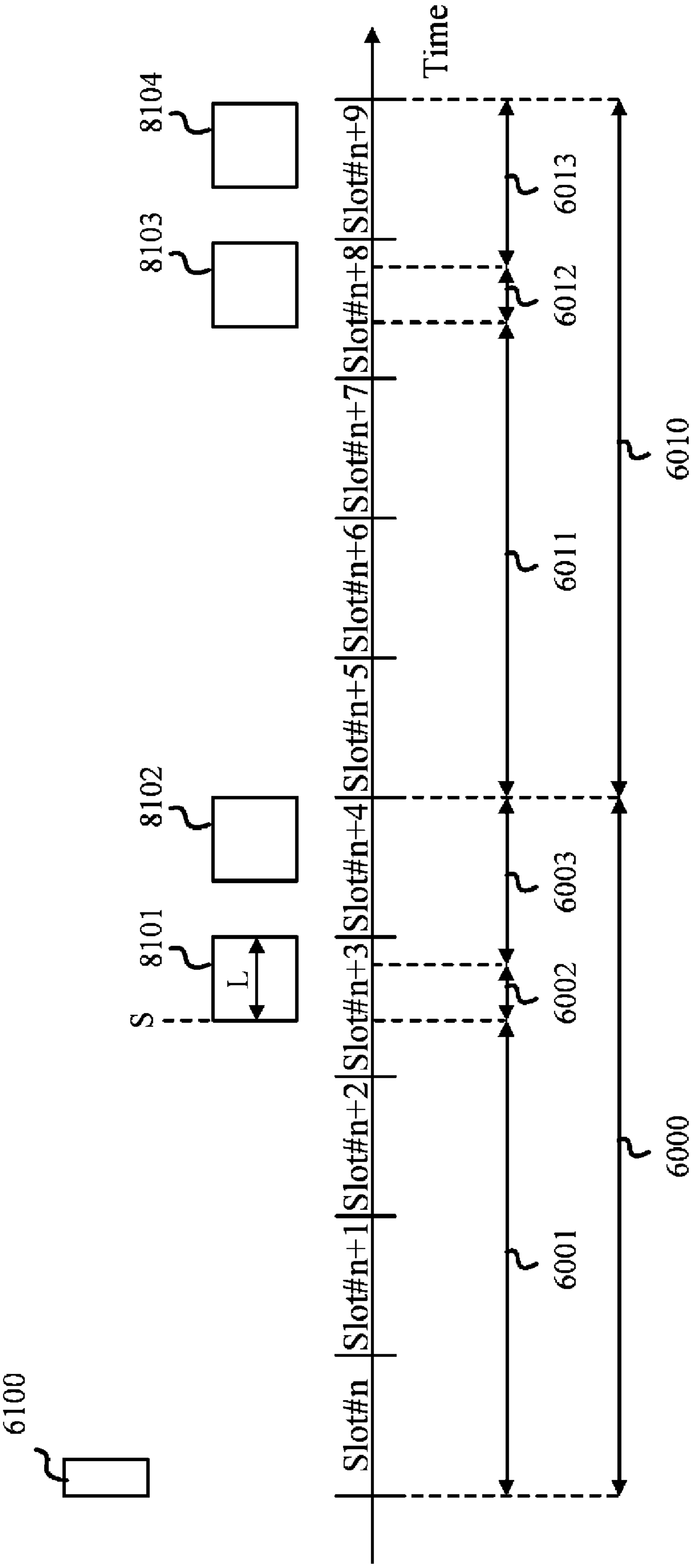
FIG. 8 is a diagram illustrating an example of PUSCH transmission according to an aspect of the present embodiment.

FIG. 8 is a diagram illustrating an example of PUSCH transmission according to an aspect of the present embodiment. After detecting the DCI format included in the PDCCH 6100, the terminal apparatus 1 determines the transmission occasion for the PUSCH. In FIG. 8, the available slot counting is used as a method of determining the transmission occasion for the PUSCH.

For example, in the available slot counting, the first K slots may be identified among the slots available after the first slot of the PUSCH. In FIG. 8, first, the availability of the slots after the first slot (slot #n+3) of the PUSCH is checked, and among the available slots determined based on the check, slots #n+3, n+4, n+8, and n+9 corresponding to the first K slots are identified. One transmission occasion is mapped to each of the four identified available slots. In other words, a transmission occasion 8101 is mapped to slot #n+3, a transmission occasion 8102 is mapped to slot #n+4, a transmission occasion 8103 is mapped to slot #n+8, and a transmission occasion 8104 is mapped to slot #n+9.

In this way, the physical slot counting (first slot counting) may be such a method in which the slots after the first slot of the PUSCH are counted and K slots are identified. In other words, the physical slot counting (first slot counting) may be a method in which slots are counted without an availability check for each slot to identify K slots. The available slot counting (second slot counting) may be such a method in which available slots among the slots after the first slot of the PUSCH are counted and K available slots are identified. In other words, the available slot counting may be such a method in which slots are counted based on the availability check for each slot to identify K available slots. Note that identification of available slots (check of slot availability) will be described below.

Note that, in another example, the available slot counting may be such a method in which available slots are counted and identified among the slots after the first slot of the PUSCH. In other words, the available slot counting may be such a method in which slots are counted based on the availability check for each slot after the first slot of the PUSCH to identify K−1 available slots. Here, the first slot of the PUSCH may be determined to be an available slot without depending on the slot availability check. As a result, the available slot counting may identify a total of K available slots, one available slot and K−1 available slots based on the availability check for each slot after the first slot of the PUSCH.

Here, in the slot availability check, a set of OFDM symbols may be checked for availability. Here, the set of OFDM symbols may be determined based on the first symbol index S of the PUSCH and the length L of the PUSCH. For example, the set of OFDM symbols may include OFDM symbols from the OFDM symbol with index S to the OFDM symbol with index S+L−1.

In the slot availability check, such a slot for which one or both of Items 1 and 2 described below are satisfied for the set of OFDM symbols may be determined to be an available slot.

Item 1: none of the OFDM symbols included in the set of OFDM symbols is a downlink symbol determined by the RRC parameter.

Item 2: none of the OFDM symbols included in the set of OFDM symbols is an OFDM symbol configured for transmission of the SS/PBCH block.

In other words, the slot availability may be determined based on one or both of whether the set of OFDM symbols includes a downlink symbol determined by the RRC parameter and whether the set of OFDM symbols includes an OFDM symbol configured for transmission of the SS/PBCH block. The check based on Item 2 may be performed on a flexible symbol determined by the RRC parameter.

The slot availability need not be affected by a change in the flexible region according to DCI format 2_0. For example, even in a case that a part of the set of OFDM symbols includes flexible symbols and the flexible symbols are changed to downlink symbols according to the information provided by DCI format 2_0, the slot availability check may be performed under the assumption that the part of the set of OFDM symbols includes flexible symbols.

The radio resource control layer processing circuitry 16 may provide the RRC parameter indicating the configuration for transmission of the SS/PBCH block.

The physical layer processing circuitry 10 may provide the number of repetitions K or the identified number of transmission occasions to the medium access control layer processing circuitry 15. The physical layer processing circuitry 10 may provide the medium access control layer processing circuitry 15 with the HARQ information related to the transmission of the PUSCH.

The medium access control layer processing circuitry may invoke the HARQ process up to K times based on the uplink grant corresponding to the DCI format 6100. Here, each time the HARQ process is invoked, the HARQ process may provide a PUSCH transmission indication to the physical layer processing circuitry 10.

The physical layer processing circuitry 10 may transmit the PUSCH according to the PUSCH transmission indication from the HARQ process. The PUSCH transmission may be omitted (canceled, dropped). For example, in a case that any one of Items 3 to 6 is satisfied for the set of OFDM symbols, the PUSCH transmission may be omitted.

Item 3: at least one of the OFDM symbols included in the set of OFDM symbols is a downlink symbol.

Item 4: at least one of the OFDM symbols included in the set of OFDM symbols is an OFDM symbol configured for transmission of the SS/PBCH block.

Item 5: at least a part of transmission of the PUSCH collides with another PUSCH having a higher priority than the PUSCH.

Item 6: at least a part of the transmission of the PUSCH collides with the PRACH.

Change of the flexible region based on DCI format 2_0 may be considered in determining whether the transmission of the PUSCH is omitted. For example, in a case that a part of the set of OFDM symbols includes flexible symbols and the flexible symbols are changed to downlink symbols according to the information provided by DCI format 2_0, whether the transmission of the PUSCH is omitted may be determined on the assumption that the part of the set of OFDM symbols includes downlink symbols.

The radio resource control layer processing circuitry 16 may provide the RRC parameter used to determine whether the available slot counting is used to determine the transmission occasion for the PUSCH.

The following describes a specific example method of determining the transmission occasion in a case that a dedicated RRC parameter is defined that is used to determine whether the available slot counting is used in determining the transmission occasion for the PUSCH.

For example, based on the determination of whether the scheduled PUSCH is the message 3 PUSCH, the physical layer processing circuitry 10 may determine which of the physical slot counting and the available slot counting is used to determine the transmission occasion for the PUSCH. For example, in a case that the scheduled PUSCH is different from the message 3 PUSCH, the physical layer processing circuitry 10 may determine the method of determining the transmission occasion for the PUSCH based on the dedicated RRC parameter. In a case that the scheduled PUSCH is the message 3 PUSCH, the available slot counting may be used as a method of determining the transmission occasion for the PUSCH without depending on the dedicated RRC parameter.

In other words, in a case that the scheduled PUSCH is different from the message 3 PUSCH but the PUSCH is scheduled by the random access response grant, the physical layer processing circuitry 10 may determine the method of determining the transmission occasion for the PUSCH based on the dedicated RRC parameter.

In another example, in a case that the scheduled PUSCH is different from the message 3 PUSCH but the PUSCH is scheduled by the random access response grant, the physical layer processing circuitry 10 may set the number of repetitions K of the PUSCH to 1.

In another example, in a case that the scheduled PUSCH is different from the message 3 PUSCH but the PUSCH is scheduled by the random access response grant, the physical layer processing circuitry 10 may use the available slot counting as a method of determining the transmission occasion for the PUSCH without depending on the dedicated RRC parameter.

For example, in a case that the value of the dedicated RRC parameter is set to indicate that the physical slot counting is used for determining the transmission occasion and the scheduled PUSCH is different from the message 3 PUSCH, the physical layer processing circuitry 10 may use the physical slot counting for determining the transmission occasion for the PUSCH. In a case that the value of the dedicated RRC parameter is set to indicate that the available slot counting is used for determining the transmission occasion and the scheduled PUSCH is different from the message 3 PUSCH, the physical layer processing circuitry 10 may use the available slot counting for determining the transmission occasion for the PUSCH. In a case that the value of the dedicated RRC parameter is set to indicate that the physical slot counting is used for determining the transmission occasion and the scheduled PUSCH is the message 3 PUSCH, the physical layer processing circuitry 10 may use the available slot counting for determining the transmission occasion for the PUSCH. In a case that the value of the dedicated RRC parameter is set to indicate that the available slot counting is used for determining the transmission occasion and the scheduled PUSCH is the message 3 PUSCH, the physical layer processing circuitry 10 may use the available slot counting for determining the transmission occasion for the PUSCH.

In this case, the value of the RRC parameter being void may be interpreted to mean that the value of void is set.

In other words, in a case that the value of the dedicated RRC parameter is set to indicate that the physical slot counting is used for determining the transmission occasion, the scheduled PUSCH is different from the message 3 PUSCH, and the PUSCH is scheduled by the random access response grant, the physical layer processing circuitry 10 may use the physical slot counting for determining the transmission occasion for the PUSCH. In a case that the value of the dedicated RRC parameter is set to indicate that the available slot counting is used for determining the transmission occasion, the scheduled PUSCH is different from the message 3 PUSCH, and the PUSCH is scheduled by the random access response grant, the physical layer processing circuitry 10 may use the available slot counting for determining the transmission occasion for the PUSCH.

In another example, in a case that the value of the dedicated RRC parameter is set to indicate that the physical slot counting is used for determining the transmission occasion, the scheduled PUSCH is different from the message 3 PUSCH, and the PUSCH is scheduled by the random access response grant, the physical layer processing circuitry 10 may set the number of repetitions K of the PUSCH to 1. In a case that the value of the dedicated RRC parameter is set to indicate that the available slot counting is used for determining the transmission occasion, the scheduled PUSCH is different from the message 3 PUSCH, and the PUSCH is scheduled by the random access response grant, the physical layer processing circuitry 10 may set the number of repetitions K of the PUSCH to 1.

In another example, in a case that the value of the dedicated RRC parameter is set to indicate that the physical slot counting is used for determining the transmission occasion, the scheduled PUSCH is different from the message 3 PUSCH, and the PUSCH is scheduled by the random access response grant, the physical layer processing circuitry 10 may use the available slot counting for determining the transmission occasion for the PUSCH. In a case that the value of the dedicated RRC parameter is set to indicate that the available slot counting is used for determining the transmission occasion, the scheduled PUSCH is different from the message 3 PUSCH, and the PUSCH is scheduled by the random access response grant, the physical layer processing circuitry 10 may use the available slot counting for determining the transmission occasion for the PUSCH.

For example, based on the determination of whether the scheduled PUSCH is the message 3 PUSCH and the number of repetitions K of the PUSCH, the physical layer processing circuitry 10 may determine which of the physical slot counting and the available slot counting is used to determine the transmission occasion for the PUSCH.

For example, in a case that the value of the dedicated RRC parameter is set to indicate that the physical slot counting is used for determining the transmission occasion, the number of repetitions of the scheduled PUSCH has a value greater than 1, and the PUSCH is different from the message 3 PUSCH, the physical layer processing circuitry 10 may use the physical slot counting for determining the transmission occasion for the PUSCH. In a case that the value of the dedicated RRC parameter is set to indicate that the available slot counting is used for determining the transmission occasion, the number of repetitions of the scheduled PUSCH has a value greater than 1, and the PUSCH is different from the message 3 PUSCH, the physical layer processing circuitry 10 may use the available slot counting for determining the transmission occasion for the PUSCH. In a case that the value of the dedicated RRC parameter is set to indicate that the physical slot counting is used to determine the transmission occasion, the number of repetitions of the scheduled PUSCH is 1, and the PUSCH is different from the message 3 PUSCH, the physical layer processing circuitry 10 may use the physical slot counting to determine the transmission occasion for the PUSCH. In a case that the value of the dedicated RRC parameter is set to indicate that the available slot counting is used for determining the transmission occasion, the number of repetitions of the scheduled PUSCH is 1, and the PUSCH is different from the message 3 PUSCH, the physical layer processing circuitry 10 may use the physical slot counting for determining the transmission occasion for the PUSCH. In a case that the dedicated RRC parameter is set to indicate that the physical slot counting is used to determine the transmission occasion, the number of repetitions of the scheduled PUSCH has a value greater than 1, and the PUSCH is a message 3 PUSCH, the physical layer processing circuitry 10 may use the available slot counting to determine the transmission occasion for the PUSCH. In a case that the value of the dedicated RRC parameter is set to indicate that the available slot counting is used to determine the transmission occasion, the number of repetitions of the scheduled PUSCH has a value greater than 1, and the PUSCH is the message 3 PUSCH, the physical layer processing circuitry 10 may use the available slot counting to determine the transmission occasion for the PUSCH. In a case that the value of the dedicated RRC parameter is set to indicate that the physical slot counting is used to determine the transmission occasion, the number of repetitions of the scheduled PUSCH is 1, and the PUSCH is the message 3 PUSCH, the physical layer processing circuitry 10 may use the physical slot counting to determine the transmission occasion for the PUSCH. In a case that the value of the dedicated RRC parameter is set to indicate that the available slot counting is used for determining the transmission occasion, the number of repetitions of the scheduled PUSCH is 1, and the PUSCH is the message 3 PUSCH, the physical layer processing circuitry 10 may use the physical slot counting for determining the transmission occasion for the PUSCH.

In other words, in a case that the value of the dedicated RRC parameter is set to indicate that the physical slot counting is used for determining the transmission occasion, the number of repetitions of the scheduled PUSCH has a value greater than 1, the PUSCH is different from the message 3 PUSCH, and the PUSCH is scheduled by the random access response grant, the physical layer processing circuitry 10 may use the physical slot counting for determining the transmission occasion for the PUSCH. In a case that the value of the dedicated RRC parameter is set to indicate that the available slot counting is used for determining the transmission occasion, the number of repetitions of the scheduled PUSCH has a value greater than 1, the PUSCH is different from the message 3 PUSCH, and the PUSCH is scheduled by the random access response grant, the physical layer processing circuitry 10 may use the available slot counting for determining the transmission occasion for the PUSCH. In a case that the value of the dedicated RRC parameter is set to indicate that the physical slot counting is used for determining the transmission occasion, the number of repetitions of the scheduled PUSCH is 1, the PUSCH is different from the message 3 PUSCH, and the PUSCH is scheduled by the random access response grant, the physical layer processing circuitry 10 may use the physical slot counting for determining the transmission occasion for the PUSCH. In a case that the value of the dedicated RRC parameter is set to indicate that the available slot counting is used for determining the transmission occasion, the number of repetitions of the scheduled PUSCH is 1, the PUSCH is different from the message 3 PUSCH, and the PUSCH is scheduled by the random access response grant, the physical layer processing circuitry 10 may use the physical slot counting for determining the transmission occasion for the PUSCH.

In another example, in a case that the value of the dedicated RRC parameter is set to indicate that the physical slot counting is used for determining the transmission occasion, the number of repetitions of the scheduled PUSCH has a value greater than 1, the PUSCH is different from the message 3 PUSCH, and the PUSCH is scheduled by the random access response grant, the physical layer processing circuitry 10 may use the available slot counting for determining the transmission occasion for the PUSCH. In a case that the value of the dedicated RRC parameter is set to indicate that the available slot counting is used for determining the transmission occasion, the number of repetitions of the scheduled PUSCH has a value greater than 1, the PUSCH is different from the message 3 PUSCH, and the PUSCH is scheduled by the random access response grant, the physical layer processing circuitry 10 may use the available slot counting for determining the transmission occasion for the PUSCH. In a case that the value of the dedicated RRC parameter is set to indicate that the physical slot counting is used for determining the transmission occasion, the number of repetitions of the scheduled PUSCH is 1, the PUSCH is different from the message 3 PUSCH, and the PUSCH is scheduled by the random access response grant, the physical layer processing circuitry 10 may use the physical slot counting for determining the transmission occasion for the PUSCH. In a case that the value of the dedicated RRC parameter is set to indicate that the available slot counting is used for determining the transmission occasion, the number of repetitions of the scheduled PUSCH is 1, the PUSCH is different from the message 3 PUSCH, and the PUSCH is scheduled by the random access response grant, the physical layer processing circuitry 10 may use the physical slot counting for determining the transmission occasion for the PUSCH.

The following describes a specific example method of determining the transmission occasion in a case that a dedicated RRC parameter is defined that is used to determine whether the available slot counting is used in identifying the transmission occasion for the PUSCH and a common RRC parameter is defined that is used to determine whether the available slot counting is used in identifying the transmission occasion for the message 3 PUSCH.

For example, based on the determination of whether the scheduled PUSCH is the message 3 PUSCH, the physical layer processing circuitry 10 may determine which of the physical slot counting and the available slot counting is used to determine the transmission occasion for the PUSCH. For example, in a case that the scheduled PUSCH is different from the message 3 PUSCH, the physical layer processing circuitry 10 may determine the method of determining the transmission occasion for the PUSCH based on the value of the dedicated RRC parameter. In a case that the scheduled PUSCH is the message 3 PUSCH, the method of determining the transmission occasion for the PUSCH may be determined based on the value of the common RRC parameter.

For example, in a case that the value of the dedicated RRC parameter is set to indicate that the physical slot counting is used for determining the transmission occasion, the value of the common RRC parameter is set to indicate that the physical slot counting is used for determining the transmission occasion, and the PUSCH is different from the message 3 PUSCH, the physical layer processing circuitry 10 may use the physical slot counting for determining the transmission occasion for the PUSCH. In a case that the value of the dedicated RRC parameter is set to indicate that the available slot counting is used for determining the transmission occasion, the value of the common RRC parameter is set to indicate that the physical slot counting is used for determining the transmission occasion, and the PUSCH is different from the message 3 PUSCH, the physical layer processing circuitry 10 may use the available slot counting for determining the transmission occasion for the PUSCH. In a case that the value of the dedicated RRC parameter is set to indicate that the physical slot counting is used for determining the transmission occasion, the value of the common RRC parameter is set to indicate that the available slot counting is used for determining the transmission occasion, and the PUSCH is different from the message 3 PUSCH, the physical layer processing circuitry 10 may use the physical slot counting for determining the transmission occasion for the PUSCH. In a case that the value of the dedicated RRC parameter is set to indicate that the available slot counting is used for determining the transmission occasion, the value of the common RRC parameter is set to indicate that the available slot counting is used for determining the transmission occasion, and the PUSCH is different from the message 3 PUSCH, the physical layer processing circuitry 10 may use the available slot counting for determining the transmission occasion for the PUSCH. In a case that the value of the dedicated RRC parameter is set to indicate that the physical slot counting is used for determining the transmission occasion, the value of the common RRC parameter is set to indicate that the physical slot counting is used for determining the transmission occasion, and the PUSCH is the message 3 PUSCH, the physical layer processing circuitry 10 may use the physical slot counting for determining the transmission occasion for the PUSCH. In a case that the value of the dedicated RRC parameter is set to indicate that the available slot counting is used for determining the transmission occasion, the value of the common RRC parameter is set to indicate that the physical slot counting is used for determining the transmission occasion, and the PUSCH is the message 3 PUSCH, the physical layer processing circuitry 10 may use the physical slot counting for determining the transmission occasion for the PUSCH. In a case that the value of the dedicated RRC parameter is set to indicate that the physical slot counting is used for determining the transmission occasion, the value of the common RRC parameter is set to indicate that the available slot counting is used for determining the transmission occasion, and the PUSCH is the message 3 PUSCH, the physical layer processing circuitry 10 may use the available slot counting for determining the transmission occasion for the PUSCH. In a case that the value of the dedicated RRC parameter is set to indicate that the available slot counting is used for determining the transmission occasion, the value of the common RRC parameter is set to indicate that the available slot counting is used for determining the transmission occasion, and the PUSCH is the message 3 PUSCH, the physical layer processing circuitry 10 may use the available slot counting for determining the transmission occasion for the PUSCH.

In other words, in a case that the value of the dedicated RRC parameter is set to indicate that the physical slot counting is used for determining the transmission occasion, the value of the common RRC parameter is set to indicate that the physical slot counting is used for determining the transmission occasion, the PUSCH is different from the message 3 PUSCH, and the PUSCH is scheduled by the random access response grant, the physical layer processing circuitry 10 may use the physical slot counting for determining the transmission occasion for the PUSCH. In a case that the value of the dedicated RRC parameter is set to indicate that the available slot counting is used for determining the transmission occasion, the value of the common RRC parameter is set to indicate that the physical slot counting is used for determining the transmission occasion, the PUSCH is different from the message 3 PUSCH, and the PUSCH is scheduled by the random access response grant, the physical layer processing circuitry 10 may use the available slot counting for determining the transmission occasion for the PUSCH. In a case that the value of the dedicated RRC parameter is set to indicate that the physical slot counting is used for determining the transmission occasion, the value of the common RRC parameter is set to indicate that the available slot counting is used for determining the transmission occasion, the PUSCH is different from the message 3 PUSCH, and the PUSCH is scheduled by the random access response grant, the physical layer processing circuitry 10 may use the physical slot counting for determining the transmission occasion for the PUSCH. In a case that the value of the dedicated RRC parameter is set to indicate that the available slot counting is used for determining the transmission occasion, the value of the common RRC parameter is set to indicate that the available slot counting is used for determining the transmission occasion, the PUSCH is different from the message 3 PUSCH, and the PUSCH is scheduled by the random access response grant, the physical layer processing circuitry 10 may use the available slot counting for determining the transmission occasion for the PUSCH.

In another example, in a case that the value of the dedicated RRC parameter is set to indicate that the physical slot counting is used for determining the transmission occasion, the value of the common RRC parameter is set to indicate that the physical slot counting is used for determining the transmission occasion, the PUSCH is different from the message 3 PUSCH, and the PUSCH is scheduled by the random access response grant, the physical layer processing circuitry 10 may use the physical slot counting for determining the transmission occasion for the PUSCH. In a case that the value of the dedicated RRC parameter is set to indicate that the available slot counting is used for determining the transmission occasion, the value of the common RRC parameter is set to indicate that the physical slot counting is used for determining the transmission occasion, the PUSCH is different from the message 3 PUSCH, and the PUSCH is scheduled by the random access response grant, the physical layer processing circuitry 10 may use the physical slot counting for determining the transmission occasion for the PUSCH. In a case that the value of the dedicated RRC parameter is set to indicate that the physical slot counting is used for determining the transmission occasion, the value of the common RRC parameter is set to indicate that the available slot counting is used for determining the transmission occasion, the PUSCH is different from the message 3 PUSCH, and the PUSCH is scheduled by the random access response grant, the physical layer processing circuitry 10 may use the available slot counting for determining the transmission occasion for the PUSCH. In a case that the value of the dedicated RRC parameter is set to indicate that the available slot counting is used for determining the transmission occasion, the value of the common RRC parameter is set to indicate that the available slot counting is used for determining the transmission occasion, the PUSCH is different from the message 3 PUSCH, and the PUSCH is scheduled by the random access response grant, the physical layer processing circuitry 10 may use the available slot counting for determining the transmission occasion for the PUSCH.

In another example, regardless of the value of the dedicated RRC parameter and the value of the common RRC parameter, the physical layer processing circuitry 10 may set the number of repetitions of the PUSCH to 1 in a case that the PUSCH is different from the message 3 PUSCH and the PUSCH is scheduled by the random access response grant.

For example, in a case that the value of the dedicated RRC parameter is set to indicate that the physical slot counting is used for determining the transmission occasion, the value of the common RRC parameter is set to indicate that the physical slot counting is used for determining the transmission occasion, the PUSCH is different from the message 3 PUSCH, and the number of repetitions K of the PUSCH is greater than 1, the physical layer processing circuitry 10 may use the physical slot counting for determining the transmission occasion for the PUSCH. In a case that the value of the dedicated RRC parameter is set to indicate that the available slot counting is used for determining the transmission occasion, the value of the common RRC parameter is set to indicate that the physical slot counting is used for determining the transmission occasion, the PUSCH is different from the message 3 PUSCH, and the number of repetitions K of the PUSCH is greater than 1, the physical layer processing circuitry 10 may use the available slot counting for determining the transmission occasion for the PUSCH. In a case that the value of the dedicated RRC parameter is set to indicate that the physical slot counting is used for determining the transmission occasion, the value of the common RRC parameter is set to indicate that the available slot counting is used for determining the transmission occasion, the PUSCH is different from the message 3 PUSCH, and the number of repetitions K of the PUSCH is greater than 1, the physical layer processing circuitry 10 may use the physical slot counting for determining the transmission occasion for the PUSCH. In a case that the value of the dedicated RRC parameter is set to indicate that the available slot counting is used for determining the transmission occasion, the value of the common RRC parameter is set to indicate that the available slot counting is used for determining the transmission occasion, the PUSCH is different from the message 3 PUSCH, and the number of repetitions K of the PUSCH is greater than 1, the physical layer processing circuitry 10 may use the available slot counting for determining the transmission occasion for the PUSCH. In a case that the value of the dedicated RRC parameter is set to indicate that the physical slot counting is used for determining the transmission occasion, the value of the common RRC parameter is set to indicate that the physical slot counting is used for determining the transmission occasion, the PUSCH is the message 3 PUSCH, and the number of repetitions K of the PUSCH is greater than 1, the physical layer processing circuitry 10 may use the physical slot counting for determining the transmission occasion for the PUSCH. In a case that the value of the dedicated RRC parameter is set to indicate that the available slot counting is used for determining the transmission occasion, the value of the common RRC parameter is set to indicate that the physical slot counting is used for determining the transmission occasion, the PUSCH is the message 3 PUSCH, and the number of repetitions K of the PUSCH is greater than 1, the physical layer processing circuitry 10 may use the physical slot counting for determining the transmission occasion for the PUSCH. In a case that the value of the dedicated RRC parameter is set to indicate that the physical slot counting is used for determining the transmission occasion, the value of the common RRC parameter is set to indicate that the available slot counting is used for determining the transmission occasion, the PUSCH is the message 3 PUSCH, and the number of repetitions K of the PUSCH is greater than 1, the physical layer processing circuitry 10 may use the available slot counting for determining the transmission occasion for the PUSCH. In a case that the value of the dedicated RRC parameter is set to indicate that the available slot counting is used for determining the transmission occasion, the value of the common RRC parameter is set to indicate that the available slot counting is used for determining the transmission occasion, the PUSCH is the message 3 PUSCH, and the number of repetitions K of the PUSCH is greater than 1, the physical layer processing circuitry 10 may use the available slot counting for determining the transmission occasion for the PUSCH.

In another example, regardless of the value of the dedicated RRC parameter and the value of the common RRC parameter, the physical layer processing circuitry 10 may use the physical slot counting to determine the transmission occasion for the PUSCH in a case that the number of repetitions K of the PUSCH is 1.

The time domain window will be described below.

The Time Domain Window may indicate a time domain period. For example, the time domain window may be used for DMRS Bundling. The terminal apparatus 1 that performs the DMRS bundling may enable channel estimation using DMRSs included in two or more PUSCHs in a period based on the time domain window. The terminal apparatus 1 that performs the DMRS bundling may be expected to maintain one or both of phase continuity and power consistency between two PUSCHs in the period based on the time domain window. The DMRS bundling may be referred to as Joint Channel Estimation.

The time domain window may be a collective term for the Configured Time Domain Window and the Actual Time Domain Window.

The configured time domain window may include one or multiple continuous slots. The configured time domain window may be configured by one or multiple higher layer parameters. For example, the one or multiple higher layer parameters may include one or multiple parameters that can enable the configured time domain window. For example, the one or multiple higher layer parameters may include one or multiple parameters indicating the length of the configured time domain window. The length of the configured time domain window may be referred to as a window length. The configured time domain window may include slots corresponding to the window length. The start position of the configured time domain window may be determined based on the first PUSCH of the PUSCH repetition transmission. For example, the start position of the configured time domain window may be the first slot of the PUSCH repetition transmission. For example, the start position of the configured time domain window may be the first slot in which the PUSCH to which the PUSCH repetition type A is applied is transmitted. For example, the start position of the configured time domain window may be a slot corresponding to the first transmission occasion for the PUSCH to which the PUSCH repetition type A is applied.

The window length may be determined based on the bundle. For example, the window length may be a bundle. For example, the window length may be used as a bundle for the inter-bundle frequency hopping. For example, one of the first hop and the second hop may correspond to multiple PUSCH transmissions in the configured time domain window. A part or both of the configured time domain window and the window length may be used for precoding. For example, the same precoding may be applied to the multiple PUSCH transmissions in the configured time domain window. A part or both of the configured time domain window and the window length may be used for terminal adjustment of the terminal apparatus 1. For example, frequency out-of-sync need not be corrected in the configured time domain window. For example, in the configured time domain window, temporal timing out-of-sync need not be corrected. For example, antenna virtualization need not be adjusted in the configured time domain window. For example, an analog circuit controlled by digital signals need not be adjusted in the configured time domain window. For example, a high frequency circuit need not be adjusted in the configured time domain window. The adjustment of the high frequency circuit may include a part or all of a change of an operating point in a power amplifier, a change of a gain in the power amplifier, phase synchronization in an oscillator, phase adjustment in two carrier waves, phase adjustment in a phase shifter, and stop of power supply to the high frequency circuit.

The window length may have a predetermined maximum period. For example, the terminal apparatus 1 may report the maximum period to the base station apparatus 3. For example, the maximum period may be the number of repetitions.

One or more window lengths may be configured in the PUSCH-Config. One or multiple window lengths may be configured in PUSCH-ConfigCommon. For example, one of the one or multiple window lengths may be determined based on the DCI format. For example, one of the one or multiple window lengths may be determined based on a time domain resource assignment field included in the DCI.

In Frequency Division Duplex, two or more configured time domain windows may be continuous. For example, the last slot in a first configured time domain window may be continuous with the first slot in a second configured time domain window.

In the time division duplex, two or more configured time domain windows may be continuous. In the time division duplex, the two or more configured time domain windows need not be continuous. For example, the start position of the configured time domain window may be determined based at least on one or both of tdd-UL-DL-ConfigurationCommon and tdd-UL-DL-ConfigurationDedicated. For example, the start position of the configured time domain window need not include DL slot.

The first one of the one or multiple configured time domain windows may end immediately before the DL slot. All of the one or multiple configured time domain windows other than the first configured time domain window may be aligned with the periodicity given dl-UL-TransmissionPeriodicity.

The configured time domain window may end based on a certain slot index. For example, in a case that $n^{\mu}_{s,f}$ is a first value, the time domain window configured at the end of the slot corresponding to $n^{\mu}_{s,f}$ may end. The configured time domain window may be applied to the PUSCH transmitted in the slot. The first value may be 0. The first value may be configured by a higher layer parameter. The first value may be determined based on a certain periodicity. For example, the certain period may be used for processing performed with each certain periodicity. The certain periodicity may be an integer multiple of the window length of the configured time domain window. The first value may be determined by the certain periodicity and the offset. In a case that $n^{\mu}_{s,f}$ is the second value, the time domain window configured at the end of the slot corresponding to $n^{\mu}_{s,f}$ may end. The difference between the first value and the second value may be the certain periodicity.

The last one of the one or multiple configured time domain windows may end at the slot corresponding to the last PUSCH in the PUSCH repetition transmission.

One or more actual time domain windows may be determined in the configured time domain windows. The multiple actual time domain windows need not be continuous with each other. The terminal apparatus 1 may be expected to maintain phase continuity and power consistency in the actual time domain window. The actual time domain window may include one or multiple slots. The actual time domain window may include one or multiple OFDM symbols.

The actual time domain window may be determined based on an event occurring within the configured time domain window. The actual time domain window may be determined based on the slot or the OFDM symbol corresponding to the event in the configured time domain window. The actual time domain window need not include the slot or the OFDM symbol corresponding to the event in the configured time domain window. For example, the event may include some or all of reception of a downlink physical channel, and transmission of a high-priority channel, a slot format indication, frequency hopping, a cancellation indication.

For example, the slot or the OFDM symbol corresponding to the event may be a slot or an OFDM symbol in which the PUSCH repetition transmission is cancelled. For example, the slot corresponding to the event may be a DL slot. For example, the slot or the OFDM symbol corresponding to the event may be a slot or an OFDM symbol including a DL reception opportunity. For example, the slot or the OFDM symbol corresponding to the event may be a slot or an OFDM symbol in which a high-priority channel is transmitted. For example, the slot corresponding to the event may be a slot indicated as a DL slot or a special slot by the slot format indication. For example, the OFDM symbol corresponding to the event may be an OFDM symbol indicated as a DL symbol or a flexible symbol by the slot format indication. For example, in a case that the n−1th slot is associated with the first hop, the slot corresponding to the event may be the nth slot associated with the second hop. For example, in a case that the n−1th slot is associated with the second hop, the slot corresponding to the event may be the nth slot associated with the first hop. For example, in a case that the n−1th OFDM symbol is associated with the first hop, the OFDM symbol corresponding to the event may be the nth OFDM symbol associated with the second hop. For example, in a case that the n−1th slot is associated with the second hop, the OFDM symbol corresponding to the event may be the nth OFDM symbol associated with the first hop.

The actual time domain window may include an OFDM symbol in which no PUSCH is transmitted. For example, the actual time domain window may include 13 continuous OFDM symbols, and the terminal apparatus 1 need not transmit the uplink physical channel and the uplink physical signal in the 13 continuous OFDM symbols.

The terminal apparatus 1 may maintain phase continuity and transmit power consistency in the actual time domain window based on requirements for phase continuity and transmit power consistency. For example, in the actual time domain window, two OFDM symbols in which an uplink physical channel and an uplink physical signal are transmitted may correspond to the same antenna port. For example, the terminal apparatus 1 may determine, based on whether a certain actual time domain window includes the first channel and the second channel, whether the first channel on which a symbol in a certain antenna port is conveyed should be transmitted in such a manner that the first channel can be estimated from the second channel on which the other symbols in the certain antenna port are conveyed. For example, in a case that the certain actual time domain window includes the first channel and the second channel, the terminal apparatus 1 may transmit the first channel on which the symbol in the certain antenna port is conveyed in such a manner that the first channel can be estimated from the second channel on which the other symbols in the certain antenna port are conveyed. In a case that the certain actual time domain window does not include the first channel or the second channel, the terminal apparatus 1 need not transmit the first channel on which the symbol on the certain antenna port is conveyed can be estimated from the second channel on which the other symbols in the certain antenna port is conveyed. Here, the first channel may be different from the second channel. Alternatively, the first channel may be the same as the second channel. The first channel may be a certain Repetition of third channels, and the second channel may be another repetition of the third channels. For example, the terminal apparatus 1 need not change the parameter related to precoding for the PUCCH and/or the PUSCH within the actual time domain window. For example, the parameter related to precoding may be a precoding matrix for spatial multiplexing. The parameter related to precoding may be a higher layer parameter txConfig. The parameter related to precoding may be a Transmitted Precoding Matrix Indicator (TPMI). The TPMI may be given by the DCI format. The parameter related to the precoding may be an SRS Resource Indicator (SRI). The terminal apparatus 1 may apply one precoding to the repetition of the PUSCH in the actual time domain window. For example, power control may be performed for the first PUSCH in the actual time domain window. Power control need not be performed for one or multiple PUSCHs except for the first PUSCH in the actual time domain window. For example, the value of the TPC command field may be applied for the first PUSCH in the actual time domain window. The value of the TPC command field need not be applied for one or multiple PUSCHs except for the first PUSCH in the actual time domain window. The TPC command field for the PUSCH may be included in some or all of the DCI format 0_0, and the DCI format 0_1, the DCI format 0_2, the DCI format 2_2, the DCI format 2_3, the random access response grant. The terminal apparatus 1 need not perform the frequency hopping for the repetition of the PUSCH in the actual time domain window. Not performing the frequency hopping may mean that the repetition of the PUCCH in the actual time domain window is at least mapped to one of the first hop or the second hop. The terminal apparatus 1 need not perform beam switching on the PUSCH within the actual time domain window. The terminal apparatus 1 need not change the configuration of the modulation scheme and the modulation order for the PUSCH transmission in the actual time domain window. The terminal apparatus 1 need not change the index of the first resource block and the number of resource blocks for the PUSCH transmission in the actual time domain window. One or multiple PUSCHs within the actual time domain window may correspond to the same time domain resource assignment. The same precoding may be applied to one or multiple PUSCHs within the actual time domain window. The same transmission power control may be applied to one or multiple PUSCHs within the actual time domain window. One or multiple PUSCHs within the actual time domain window may be at least located in a same resource block. The terminal apparatus 1 may transmit a baseband signal with an amplitude of 0 between two discontinuous PUSCHs within the actual time domain window.

In the repeated transmission of the PUSCH, the transmission power control may be performed for each PUSCH transmission unit (also referred to as a PUSCH transmission occasion). Here, the transmission power P of a certain PUSCH transmission unit i may be determined based on at least some or all of $P_{CMAX}$, $P_0$, α, PL, and f(i).

Here, $P_{CMAX}$ may indicate a configured maximum transmission power value of the serving cell. $P_0$ may indicate target received power configured by the base station apparatus 3. Here, $P_0$ may be determined by the values of one or multiple RRC parameters. α may be a coefficient by which the PL is multiplied. The PL may indicate a path loss value estimated by the terminal apparatus 1 using a path loss estimation signal. f(i) may be calculated in one of two different manners using a cumulative method and a direct method. The radio resource control layer processing circuitry 16 may provide a parameter for determining whether the calculation method for f(i) is a cumulative method or a direct method.

For example, in the cumulative method, $f(i)=f(i-i_0)+\Delta$ may be used for calculation. Here, $i_0$ may be determined to be a minimum positive integer among $i_0$ that satisfies the condition that a first OFDM symbol that is $K_{PUSCH}(i-i_0)$ symbols before an OFDM symbol immediately before a PUSCH transmission unit $i-i_0$ precedes a second OFDM symbol that is $K_{PUSCH}(i)$ symbols before the OFDM symbol immediately before the PUSCH transmission unit i. Here, the PUSCH transmission units i may be mapped in ascending order in the time domain.

Δ may be determined to be an accumulated value of values of TPC commands received by the terminal apparatus 1 during a prescribed period. Here, the prescribed period may be determined to be a period from a third OFDM symbol that is $K_{PUSCH}(i-i_0)-1$ symbols before the OFDM symbol immediately before the PUSCH transmission unit $i-i_0$ to the second OFDM symbol. The prescribed period may be determined based on a part or all of the position of the PUSCH transmission unit $i-i_0$, the position of the PUSCH transmission unit i, $K_{PUSCH}(i-i_0)$, and $K_{PUSCH}(i)$.

Here, in a case that the DMRS bundling is enabled for the terminal apparatus 1, the PUSCH transmission unit may be provided by a configured time domain window. For example, in a case that the DMRS bundling is enabled for the terminal apparatus 1, the PUSCH transmission unit may be the configured time domain window.

In a case that the DMRS bundling is not enabled for the terminal apparatus 1, the PUSCH transmission unit may be a transmission occasion.

In a case that the DMRS bundling is enabled for a PUSCH scheduled by a configured grant, the PUSCH transmission unit may be provided by the configured time domain window. For example, in a case that the DMRS bundling is enabled for the PUSCH scheduled by the configured grant, the PUSCH transmission unit may be the configured time domain window.

In a case that the DMRS bundling is enabled for a PUSCH scheduled by a DCI format, the PUSCH transmission unit may be the transmission occasion.

In a case that the DMRS bundling is enabled for the terminal apparatus 1, the PUSCH transmission unit may be provided by an actual time domain window. For example, in a case that the DMRS bundling is enabled for the terminal apparatus 1, the PUSCH transmission unit may be the actual time domain window.

In a case that the DMRS bundling is enabled for the PUSCH scheduled by the configured grant, the PUSCH transmission unit may be provided by the actual time domain window. For example, in a case that the DMRS bundling is enabled for the PUSCH scheduled by the configured grant, the PUSCH transmission unit may be the actual time domain window.

Various aspects of apparatuses according to an aspect of the present embodiment will be described below.

(1) In order to accomplish the object described above, an aspect of the present invention is contrived to provide the following means. Specifically, a first aspect of the present invention is a terminal apparatus including a physical layer processing circuitry that determines one or multiple transmission occasions for a PUSCH and transmits the PUSCH in each of the one or multiple transmission occasions and a radio resource control layer processing circuitry that provides an RRC parameter to the physical layer processing circuitry, in which, in determining the one or multiple transmission occasions, one or both of whether the PUSCH is a message 3 PUSCH and whether the PUSCH is scheduled by a random access response grant are considered.

(2) A second aspect of the present invention is a base station apparatus including a physical layer processing circuitry that determines one or multiple transmission occasions for a PUSCH and receives the PUSCH in each of the one or multiple transmission occasions and a radio resource control layer processing circuitry that provides an RRC parameter to the physical layer processing circuitry, in which, in determining the one or multiple transmission occasions, one or both of whether the PUSCH is a message 3 PUSCH and whether the PUSCH is scheduled by a random access response grant are considered.

A program running on the base station apparatus 3 and the terminal apparatus 1 according to the present invention may be a program (a program that causes a computer to function) that controls a Central Processing Unit (CPU) and the like so as to implement the functions of the above-described embodiment according to the present invention. The information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially implemented by a computer. In that case, this configuration may be implemented by recording a program for implementing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as peripheral devices. A "computer-readable recording medium" refers to a portable medium such as a flexible disk, a magneto-optical disk, a ROM, and a CD-ROM, and a storage apparatus such as a hard disk built into the computer system.

Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. The above-described program may be one for implementing a part of the above-described functions, and also may be one capable of implementing the above-described functions in combination with a program already recorded in a computer system.

Furthermore, the base station apparatus 3 according to the aforementioned embodiment may be implemented as an aggregation (apparatus group) including multiple apparatuses. Each of the apparatuses included in such an apparatus group may include a part or all of each function or each functional block of the base station apparatus 3 according to the aforementioned embodiment. As the apparatus group, it is only necessary to have all of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a NextGen RAN (NG-RAN or NR RAN). Moreover, the base station apparatus 3 according to the aforementioned embodiment may have a part or all of the functions of a higher node for an eNodeB and/or a gNB.

Also, a part or all portions of each of the terminal apparatus 1 and the base station apparatus 3 according to the aforementioned embodiment may be implemented as an LSI, which is typically an integrated circuit, or may be implemented as a chip set. The functional blocks of each of the terminal apparatus 1 and the base station apparatus 3 may be individually implemented as a chip, or a part or all of the functional blocks may be integrated into a chip. A circuit integration technique is not limited to the LSI and may be implemented with a dedicated circuit or a general-purpose processor. Moreover, in a case that a circuit integration technology that substitutes an LSI appears with the advance of the semiconductor technology, it is also possible to use an integrated circuit based on the technology.

In addition, although the aforementioned embodiments have described the terminal apparatus as an example of a communication apparatus, the present invention is not limited to such a terminal apparatus, and is also applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For the present invention, various modifications are possible within the scope of the claims, and embodiments that are made by suitably combining technical means disclosed according to the different embodiments are also included in the technical scope of the present invention. A configuration in which elements described in the respective embodiments and having mutually the similar effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B, 1C) Terminal apparatus
3 Base station apparatus
9 Radio communication system
10, 30 Physical layer processing circuitry
**10*a*, 30*a*** Radio transmission circuitry
**10*b*, 30*b*** Radio reception circuitry

11, 31 Antenna circuitry
12, 32 RF circuitry
13, 33 Baseband circuitry
14, 34 Higher layer processing circuitry
15, 35 Medium access control layer processing circuitry
16, 36 Radio resource control layer processing circuitry
6000, 6010 Pattern
6001, 6002, 6003, 6011, 6012, 6013 Region
6100 PDCCH
6101, 6102, 6103, 6104, 8101, 8102, 8103, 8104 Transmission occasion

The invention claimed is:

1. A terminal apparatus comprising:

Radio Resource Control (RRC) layer processing circuitry configured to manage an RRC parameter used to determine which of first slot counting and second slot counting is used to determine a transmission occasion for a Physical Uplink Shared CHannel (PUSCH); and physical layer processing circuitry configured to refer to a number of repetitions K of transmission of the PUSCH in addition to a value of the RRC parameter to determine which of the first slot counting and the second slot counting is used to determine the transmission occasion for the PUSCH, wherein:

in a case that the number of repetitions K is greater than 1, one of the first slot counting or the second slot counting is used to determine the transmission occasion for the PUSCH based on the RRC parameter, in a case that the number of repetitions K is equal to 1, the first slot counting is used to determine the transmission occasion for the PUSCH regardless of the value of the RRC parameter, and in the first slot counting, the transmission occasion for the PUSCH is determined without depending on whether a set of Orthogonal Frequency Division Multiplexing (OFDM) symbols includes a downlink symbol determined by a second RRC parameter, and whether the set of OFDM symbols includes an OFDM symbol configured for transmission of a Synchronization Signal/Physical Broadcast CHannel (SS/PBCH) block.

2. The terminal apparatus according to claim 1, wherein in the second slot counting, the transmission occasion for the PUSCH is determined based on whether the set of OFDM symbols, determined based on a value of a time domain resource assignment field included in a Downlink Control Information (DCI) format, includes the downlink symbol determined by the second RRC parameter and whether the set of OFDM symbols includes the OFDM symbol configured for the transmission of the SS/PBCH block.

3. A base station apparatus comprising:

Radio Resource Control (RRC layer processing circuitry configured to manage an RRC parameter used to determine which of first slot counting and second slot counting is used to determine a transmission occasion for a Physical Uplink Shared CHannel (PUSCH), wherein:

a number of repetitions K of transmission of the PUSCH is referred to, in addition to a value of the RRC parameter, for determining which of the first slot counting and the second slot counting is used to determine the transmission occasion for the PUSCH, in a case that the number of repetitions K is greater than 1, one of the first slot counting or the second slot counting is used to determine the transmission occasion for the PUSCH based on the RRC parameter, in a case that the number of repetitions K is equal to 1, the first slot counting is used to determine the transmission occasion for the PUSCH regardless of the value of the RRC parameter, and in the first slot counting, the transmission occasion for the PUSCH is determined without depending on whether a set of Orthogonal Frequency Division Multiplexing (OFDM) symbols includes a downlink symbol determined by a second RRC parameter, and whether the set of OFDM symbols includes an OFDM symbol configured for transmission of a Synchronization Signal/Physical Broadcast CHannel (SS/PBCH) block.

4. The base station apparatus according to claim 3, wherein in the second slot counting, the transmission occasion for the PUSCH is determined based on whether the set of OFDM symbols, determined based on a value of a time domain resource assignment field included in a Downlink Control Information (DCI) format, includes the downlink symbol determined by the second RRC parameter and whether the set of OFDM symbols includes the OFDM symbol configured for the transmission of the SS/PBCH block.

5. A communication method performed by a terminal apparatus, the communication method comprising:

managing a Radio Resource Control (RRC parameter used to determine which of first slot counting and second slot counting is used to determine a transmission occasion for a Physical Uplink Shared CHannel (PUSCH); and referring to a number of repetitions K of transmission of the PUSCH in addition to a value of the RRC parameter to determine which of the first slot counting and the second slot counting is used to determine the transmission occasion for the PUSCH, wherein:

in a case that the number of repetitions K is greater than 1, one of the first slot counting or the second slot counting is used to determine the transmission occasion for the PUSCH based on the RRC parameter, in a case that the number of repetitions K is equal to 1, the first slot counting is used to determine the transmission occasion for the PUSCH regardless of the value of the RRC parameter, and in the first slot counting, the transmission occasion for the PUSCH is determined without depending on whether a set of Orthogonal Frequency Division Multiplexing (OFDM) symbols includes a downlink symbol determined by a second RRC parameter, and whether the set of OFDM symbols includes an OFDM symbol configured for transmission of a Synchronization Signal/Physical Broadcast CHannel (SS/PBCH) block.

* * * * *